United States Patent [19]

Hamano et al.

[11] Patent Number: 5,121,221
[45] Date of Patent: Jun. 9, 1992

[54] FACSIMILE APPARATUS

[75] Inventors: Hiroaki Hamano; Hideo Muramatsu; Shigenobu Fukushina; Toshio Tsuboi; Kanako Hamano, all of Osaka, Japan

[73] Assignee: Minolta Camera Co. Ltd., Osaka, Japan

[21] Appl. No.: 480,826

[22] Filed: Feb. 15, 1990

[30] Foreign Application Priority Data

| Feb. 16, 1989 | [JP] | Japan | 1-37977 |
| Feb. 16, 1989 | [JP] | Japan | 1-37978 |
| Feb. 16, 1989 | [JP] | Japan | 1-37979 |
| Nov. 14, 1989 | [JP] | Japan | 1-296709 |

[51] Int. Cl.$^5$ ............................................. H04N 1/32
[52] U.S. Cl. ............................................. 358/426
[58] Field of Search ............ 358/400, 401, 405, 407, 358/402, 426, 261.1, 261.2, 261.3, 261.4

[56] References Cited

U.S. PATENT DOCUMENTS

| 4,876,604 | 10/1989 | Nobuta | 358/400 |
| 4,922,545 | 5/1990 | Endoh et al. | 358/426 |
| 4,937,681 | 6/1990 | Fujinawa et al. | 358/426 |

FOREIGN PATENT DOCUMENTS

| 60-64572 | 4/1985 | Japan |
| 60-119169 | 6/1985 | Japan |

Primary Examiner—Jin F. Ng
Assistant Examiner—Jerome Grant, II

[57] ABSTRACT

A facsimile apparatus comprising a document image reader for forming an image data corresponding to a document image; a data processor having multiple data processing modes for processing the image data with a mode selected; a memory having multiple memory areas, each of which stores information on a facsimile apparatus of an addressee, the above information comprising at least a line number and an addressee data processing mode; a data processor is controlled to process the image data with the data processing mode related with an addressee that has been selected; and a transmitter for transmitting the image data processed by the data processing means to the addressee selected.

23 Claims, 21 Drawing Sheets

MESSAGE 1

| INPUT THE |
| DIRECTORY NUMBER |

Fig.8A

MESSAGE 2

| INPUT THE |
| TELEPHONE NUMBER |

Fig.8B

MESSAGE 3

| INPUT THE | MH=0 |
| COMPRESSING | MR=1 |
| MODE NUMBER | MMR=2 |

Fig.8C

FACSIMILE APPARATUS

BACKGROUND OF THE INVENTION (1) Field of the Invention

This invention relates to a facsimile apparatus for transmitting an image data read from a document to an addressee through lines.

(2) Description of the Related Art

Facsimile transmission is done by connecting lines of an addresser and an addressee and sending an image data read from a document from the addresser to the addressee.

The lines are connected by dialing a line number of the addressee. In some recent models, however, line numbers can be registered in advance to eliminate the step of dialing or the same image data can be transmitted to multiple addressees one after another. There are other functions of selecting a vertical resolution or the like of the image data in accordance with the purpose, of reducing the size of the image data in accordance with the size difference between the document of the addresser and the recording paper of the addressee, and of compressing the image data with various compressing modes for sending or receiving the data in order to improve transmission efficiency.

A known facsimile apparatus, however, has the following problems. Concerning selection of vertical resolution selection or the like, since a non-standard one should be selected for each transmission by the user, operability cannot remarkably be improved even if the apparatus is equipped with the function of registering line numbers. Compressing mode selection is conducted in accordance with the conditions, functions and the like of the two apparatus. Therefore, exchange of such information and data compression based on the selected compressing mode are done after the lines are connected. Since this prolongs transmission time, the telephone fee is raised and also the apparatus cannot be used for receiving or the like during the prolonged transmission time. These problems are especially conspicuous for serial multiple addressing.

In order to solve these problems, Japanese Patent Publication Kokai No. 60-64572 has disclosed a construction wherein image data read by a reading section is first compressed with the MR (Modified READ), MH (Modified Huffman) or other data compressing mode and then stored in a memory, whereby the compressing mode is compared with a compressing mode of the addressee with which the compressed data is restored into its original form (will be referred to as addressee compressing mode hereinafter), for the purpose of multiple addressing. If the two of them correspond to each other, the image data is directly transmitted from the memory. However, if the two of them do not correspond, the stored image data is output to an expanding device for restoring it to its original form and is compressed again with the same compressing mode as the addressee compressing mode before transmission. This does not solve the problem of prolonged transmission time, or worse, further prolongs it.

SUMMARY OF THE INVENTION

Accordingly, a primary object of the present invention is to offer a facsimile apparatus for reducing transmission time, the telephone fee and also the time of using the apparatus.

The above object is fulfilled by a facsimile apparatus having a multiple addressing function for consecutively transmitting a read-out image data to multiple addressees, the apparatus comprising data compressing means for compressing an image data, the means having multiple compressing modes; compressing mode registering means for registering a desired compressing mode of the multiple compressing modes; controlling means for controlling the data compressing means to compress the image data with the compressing mode registered by the compressing mode registering means; and transmitting means for consecutively transmitting the image data compressed by the data compressing means to multiple addressees.

The above object is also fulfilled by a facsimile apparatus comprising document image reading means for forming an image data corresponding to a document image; data compressing means having multiple compressing modes for compressing the image data; memory means having multiple memory areas, each of which stores information on a facsimile apparatus of an addressee, the above information comprising at least a line number and an addressee compressing mode; first selecting means for selecting an addressee; second selecting means for selecting a compressing mode corresponding to the addressee compressing mode of the addressee selected by the first selecting means; controlling means for controlling the data compressing means to compress the image data with the compressing mode selected by the second selecting means; and transmitting means for consecutively transmitting the image data compressed by the data compressing means to multiple addressees.

The above object is also fulfilled by a facsimile apparatus comprising document image reading means for forming an image data corresponding to a document image; data compressing means having multiple compressing modes for compressing the image data; first memory means having multiple memory areas, each of which stores information on a facsimile apparatus of an addressee, the above information comprising at least a line number and an addressee compressing mode; first selecting means for selecting an addressee; second selecting means for selecting a compressing mode corresponding to the addressee compressing mode of the addressee selected by the first selecting means; controlling means for controlling the data compressing means to compress the image data with the compressing mode selected by the second selecting means; second memory means for storing the image data compressed by the data compressing means; and transmitting means for transmitting the image data stored in the second memory means to the addressee selected by the first selecting means.

The above object is also fulfilled by a data transmitting method in a facsimile apparatus comprising image data forming means for reading a document image and forming an image data corresponding to the document image and data compressing means for compressing the image data with one of multiple compressing modes and having a multiple addressing function for consecutively transmitting the image data compressed by the compressing means to multiple addressees, a data transmitting method comprising the steps of registering an arbitrary compressing mode among multiple compressing modes; controlling data compressing means to compress an image data with the registered compressing mode; and consecutively transmitting the image data compressed with the registered compressing mode to multiple addressees.

The above object is also fulfilled by a data transmitting method in a facsimile apparatus comprising image data forming means for reading a document image and forming an image data corresponding to the document image and data compressing means for compressing the image data with one of multiple compressing modes and having a multiple addressing function for consecutively transmitting the image data compressed by the compressing means to multiple addressees, a data transmitting method comprising the steps of registering line numbers and addressee compressing modes of addressees; selecting an addressee; selecting the compressing mode corresponding to the addressee compressing mode of the selected addressee; controlling data compressing means to compress the image data with the selected compressing mode; and transmitting the image data compressed with the selected compressing mode to the selected addressee.

According to the above, since the compressing mode with which the image data is to be compressed is registered in advance, the image data can be compressed prior to line connection. This reduces operation after line connection and thus shortens line connection time.

Another object of the present invention is to offer a facsimile apparatus for improving operability of image data transmission.

The above object is fulfilled by a facsimile apparatus comprising document image reading means for forming an image data corresponding to a document image; data processing means having multiple data processing modes for processing the image data with the mode selected; memory means having multiple memory areas, each of which stores information on a facsimile apparatus of an addressee, the above information comprising at least a line number and an addressee data processing mode; selecting means for selecting an addressee; controlling means for controlling the data processing means to process the image data with the data processing mode related with the addressee selected by the selecting means; and transmitting means for transmitting the image data processed by the data processing means to the addressee selected by the selecting means.

The above object is also fulfilled by a data transmitting method in a facsimile apparatus comprising image data forming means for reading a document image and forming an image data corresponding to the document image and data processing means for processing the image data with one of multiple data processing modes, for transmitting the processed image data to an addressee, a data transmitting method comprising the steps of registering line numbers and data processing modes of addressees; selecting one of the addressees; processing the image data with the data processing mode related with the selected addressee; and transmitting the processed image data to the selected addressee.

According to the above, since the line number and also the data processing mode are registered in advance, it is not necessary to process the image data for each transmission. This simplifies transmission operation and so improves operability.

Still another object of the present invention is to offer a facsimile apparatus for improving operability of registering line numbers with no need for setting data processing modes.

The above object is fulfilled by a facsimile apparatus comprising document image reading means for forming an image data corresponding to a document image; data processing means having multiple data processing modes for processing the image data with the mode selected; memory means having multiple memory register areas, each of which stores information on a facsimile apparatus of an addressee, the above information comprising at least a line number and an addressee data processing mode; selecting means for selecting an addressee; calling means for calling the addressee selected by the selecting means; controlling means for controlling the data processing means to process the image data, when the data processing mode related with the addressee selected by the selecting means is stored in the memory means, with the data processing mode stored in the memory means; and transmitting means for transmitting the image data processed by the data processing means to the addressee called by the calling means. (The apparatus will be referred to as "A" hereinafter.)

The above object is also fulfilled by a facsimile apparatus comprising first memory means for storing an addressee data indicating an addressee to which an image data is to be transmitted; second memory means for storing an additional data with which the image data is processed in accordance with the addressee; transmitting means for transmitting the image data in accordance with the addressee data stored in the first memory means; controlling means for discriminating the additional data corresponding to the addressee when the image data is transmitted by the transmitting means, and for storing the additional data in the second memory means in relation with the addressee data; and processing means for processing the image data in accordance with the additional data stored in the second memory means before the image data is transmitted by the transmitting means.

The above object is also fulfilled by a data transmitting method in a facsimile apparatus comprising image data forming means for reading a document image and forming an image data corresponding to the document image and data processing means for processing the image data with one of multiple data processing modes, for transmitting the processed image data to an addressee, a data transmitting method comprising the steps of registering line numbers of addressees; calling the addressee of which line number is registered; analyzing a signal sent from the addressee and discriminating a data processing mode of the addressee; storing the discriminated data processing mode in relation with the line number of the addressee; processing the image data with the discriminated data processing mode; and transmitting the processed image data to the addressee.

According to the above, if the data processing mode of a new addressee is not registered, the mode is automatically set based on a signal sent from the addressee by the first transmission to that addressee. This eliminates data processing mode setting operation which would be necessary when the line number is registered.

Still another object of the present invention is to offer a facsimile apparatus for executing accurate transmission even if the registered data processing mode is different from the data processing mode to actually be used due to, for example, apparatus replacement.

The above object is fulfilled by a facsimile apparatus "A", further comprising discriminating means for analyzing a signal sent from the addressee called by the calling means and discriminating the addressee data processing mode of the addressee, wherein the controlling means controls the data processing means to process the image data when the data processing mode corresponding to the addressee selected by the selecting means is not stored in the memory means with the data processing mode discriminated by the discriminating means and wherein the transmitting means transmits the image data processed by the data processing mode discriminated by the discriminating means to the addressee called by the calling means.

The above object is also fulfilled by a facsimile apparatus "A", further comprising discriminating means for analyzing a signal sent from the addressee called by the calling means and discriminating the addressee data processing mode of the addressee and re-registering means for, when the addressee data processing mode of the addressee discriminated by the discriminating means is different from the data processing mode stored in the memory means, re-registering the former data processing mode in the memory means, wherein the transmitting means transmits the image data processed by the data processing mode discriminated by the discriminating means to the addressee called by the calling means.

The above object is also fulfilled by a data transmitting method in a facsimile apparatus comprising image data forming means for reading a document image and forming an image data corresponding to the document image and data processing means for processing the image data with one of multiple data processing modes, for transmitting the processed image data to an addressee, a data transmitting method comprising the steps of registering line numbers and data processing modes of the addressees: calling the addressee of which line number is registered; analyzing a signal sent from the addressee and discriminating the data processing mode of the addressee; storing the discriminated data processing mode in relation with the line number of the addressee; processing the image data with the discriminated data processing mode; and transmitting the processed image data to the addressee.

According to the above, if the registered data processing mode is different from the data processing mode to actually be used, that fact is automatically detected and appropriate processing is executed. Also, the registered contents are automatically modified. In this way, operability is further improved.

Still another object of this invention is to offer a facsimile apparatus for shortening total transmission time of multiple addressing.

The above object is fulfilled by a facsimile apparatus comprising document image reading means for forming an image data corresponding to a document image; data compressing means having multiple compressing modes for compressing the image data; memory means having multiple memory areas, each of which stores information on a facsimile apparatus of an addressee, the above information comprising at least a line number and an addressee compressing mode; selecting means for selecting a compressing mode corresponding to an addressee compressing mode which is stored in the largest number among the addressee compressing modes stored in the memory means; controlling means for controlling the data compressing means to compress the image data with the compressing mode selected by the selecting means; and transmitting means for transmitting the image data compressed by the data compressing means.

The above object is also fulfilled by a facsimile apparatus comprising document image reading means for forming an image data corresponding to a document image; data compressing means having multiple compressing modes for compressing the image data; memory means having multiple memory areas, each of which stores information on a facsimile apparatus of an addressee, the above information comprising at least a line number and an addressee compressing mode; selecting means for selecting a compressing mode corresponding to an addressee compressing mode which is stored in the largest number among the addressee compressing modes stored in the memory means; controlling means for controlling the data compressing means to compress the image data with the compressing mode selected by the selecting means; and transmitting means for transmitting the image data compressed by the data compressing means to the addressee corresponding to the compressing mode selected by the selecting means.

The above object is also fulfilled by a data transmitting method in a facsimile apparatus comprising image data forming means for reading a document image and forming an image data corresponding to the document image and data compressing means for compressing the image data with one of multiple compressing modes and having a multiple addressing function for consecutively transmitting the image data compressed by the compressing means to multiple addressees, a data transmitting method comprising the steps of registering line numbers and addressee compressing modes of addressees; discriminating the addressee compressing mode which is registered in the largest number among the registered addressee compressing modes; selecting the compressing mode corresponding to the discriminated addressee compressing mode; compressing the image data with the selected compressing mode; and transmitting the compressed image data to an addressee.

The above object is also fulfilled by a data transmitting method in a facsimile apparatus comprising image data forming means for reading a document image and forming an image data corresponding to the document image and data compressing means for compressing the image data with one of multiple compressing modes and having a multiple addressing function for consecutively transmitting the image data compressed by the compressing means to multiple addressees, a data transmitting method comprising the steps of registering line numbers and addressee compressing modes of addressees; compressing the image data with one of multiple compressing modes; storing the compressed image data; comparing the compressing mode with which the stored image data has been compressed and the addressee compressing modes of the addressees; and transmitting the image data to the addressee corresponding to the addressee compressing mode with which the stored image data has been compressed.

According to the above, the compressing mode with which the largest number of addressees are registered is selected primarily. Also the transmission to the addressees having the same compressing mode is executed in sequence. This improves transmission efficiency and so shortens total transmission time.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

FIGS. 8a, 8b and 8c show messages displayed on an LCD display 68 of the same;

DESCRIPTION OF THE PREFERRED EMBODIMENTS

Embodiment I

A first embodiment of this invention will be described referring to FIGS. 1 through 12.

A facsimile apparatus according to this embodiment comprises a reading section 1 and a printing section 2 disposed on the printing section 1.

Figure 1:
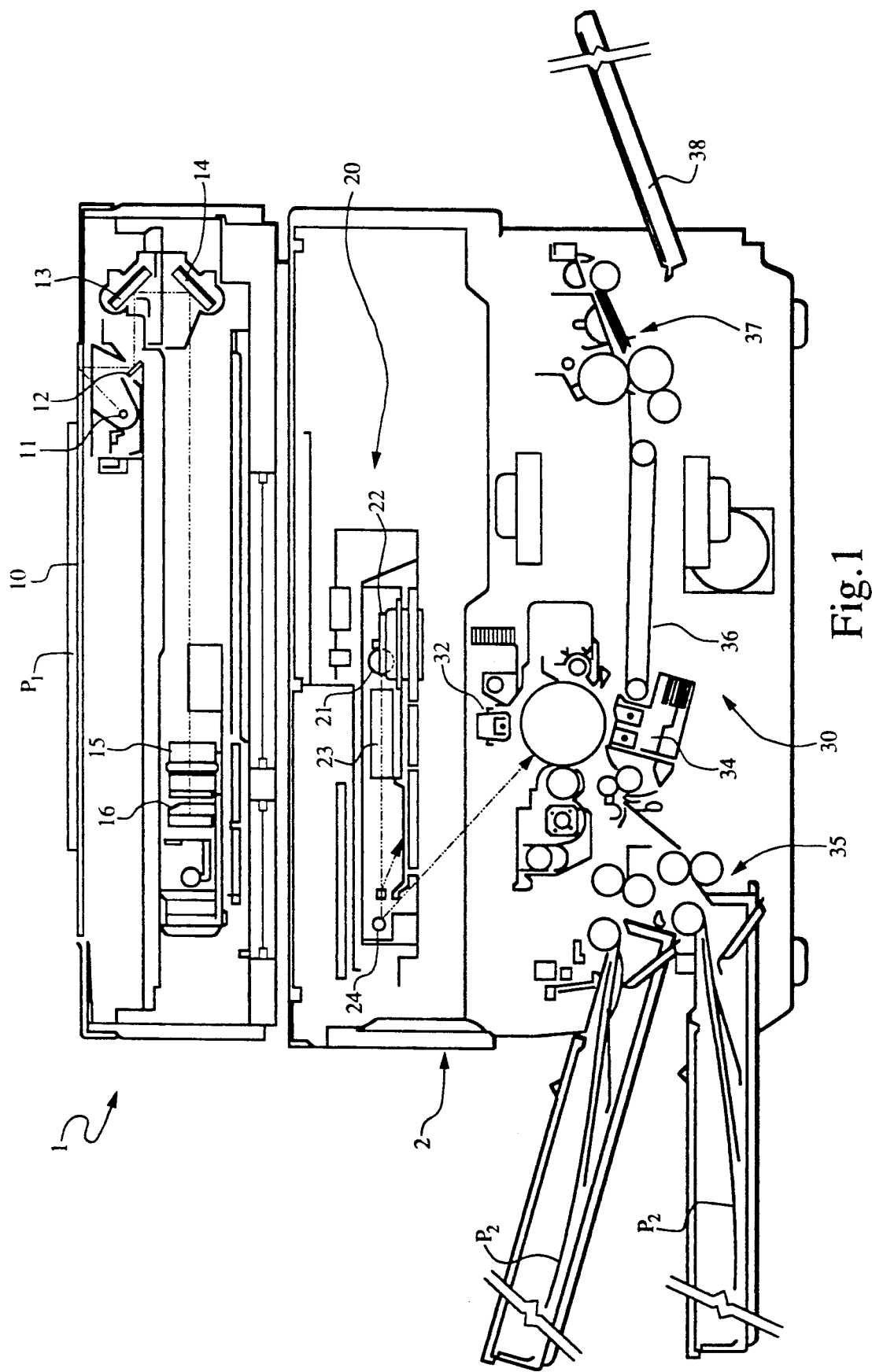
FIG. 1 is a vertical cross sectional view of a facsimile apparatus of a first embodiment according to this invention.
Figure 2:
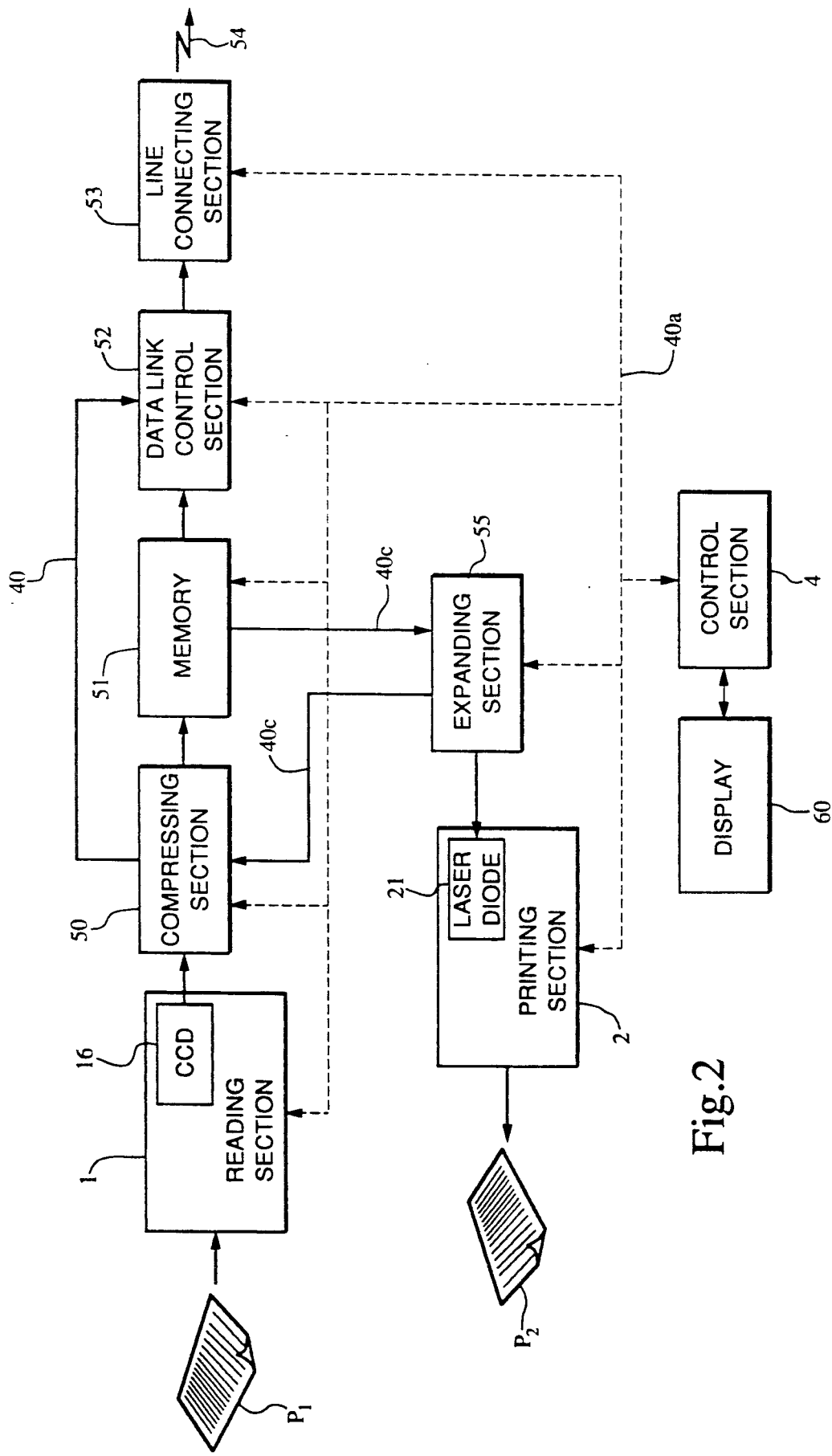
FIG. 2 is a block diagram of a data transmitting-/receiving system of the same.

The reading section 1 is constructed as shown in FIG. 1 and is operated in the following way. When a document $P_1$ is set on a glass document table 10 with a surface thereof having an image facing the table 10, an exposure lamp 11 irradiates the document $P_1$ and the light reflected on the document $P_1$ is guided through mirrors 12, 13 and 14 to be focused by a lens 15, whereby the image is projected on a CCD 16. The CCD 16 converts the image into an electric signal and transmits it to another facsimile apparatus on the other terminal of a line 54 (FIG. 2).

The lens 15 is an image reducing optical system for projecting the document image on the CCD 16 with a specified reduction ratio, and the exposure lamp 11 and the mirrors 12, 13 and 14 are movable to the right and left (FIG. 1) so as to scan the document image.

The printing section 2 comprises a laser head section 20 and a developing and fixing section 30 disposed below the laser head section 20 as shown in FIG. 1 and is operated in the following way. A laser diode 21 receives an electric signal from the facsimile apparatus on the other terminal through the line 54, converts the electric signal into an optical signal and outputs it as a laser beam. Then, a polygon mirror 22 scans the laser beam, and the scanning light exposes a photoconductive drum 31 through an f-$\theta$ lens 23 and another mirror 24.

Since the drum 31 is already charged by a main charger 32 before exposed, an electrostatic latent image is formed on the drum 31 when the drum 31 is exposed. Then, the drum 31 is supplied with a toner from a developing unit 33 to form a toner image, and the toner image is transferred by a transfer charger 34 onto a paper $P_2$ which is sent from a feeding section 35 at an appropriate timing. The paper $P_2$ having the image transferred thereon is separated from the drum 31, sent to a fixing device 37 by a transport belt 36 to have the image fixed and delivered to a tray 38.

The data transmitting/receiving operation is controlled by the control section 4 shown in FIGS. 2 and 3 in the manner below.

First, the data transmitting operation will be explained. When the reading section 1 reads the image of the document $P_1$, the CCD 16 converts the image into a binary code and outputs it to a compressing section 50. The compressing section 50 compresses the binary code by the MR, MH or MMR (Modified Modified READ) mode and the compressed data is written into a memory 51.

Figure 3:
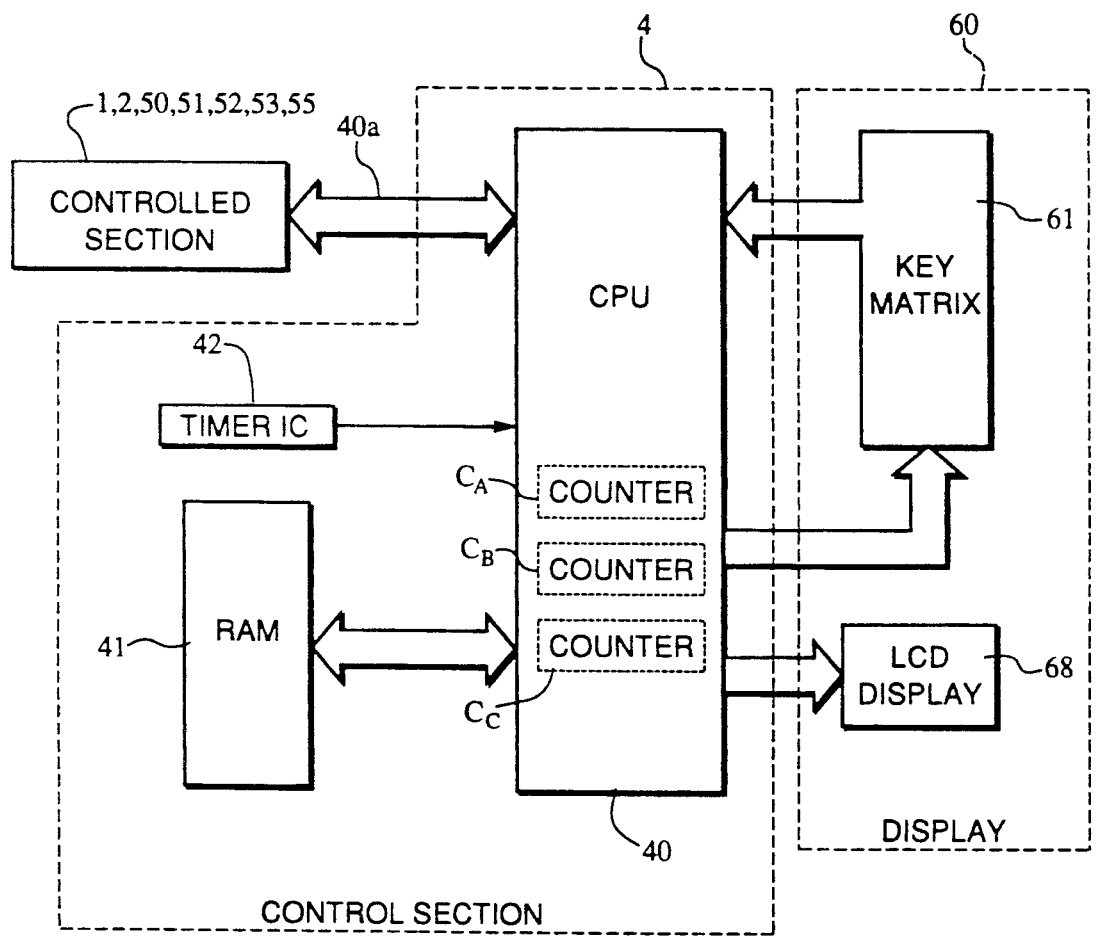
FIG. 3 is a block diagram showing a control section 4 as a core of the data transmitting/receiving system of the same.

When the data is completely written in the memory 51, completion of data writing is informed to a control section 4, more precisely a CPU 40 (FIG. 3). The CPU 40 sends a specified line connection command to a line connecting section 53 through a control signal line 40a, whereby the facsimile apparatus of this embodiment is connected with another facsimile at the other terminal. In this way, the data stored in the memory 51 is sent to the other terminal through a data link control section 52, the line connecting section 53 and the line 54.

A signal line 40b (FIG. 2) shows a path for transmitting the data from the compressing section 50 without through the memory 51. This path is used when the data can be transmitted immediately after the document image is read, for example, when data is transmitted while being read. Signal lines 40c show paths which are used when the data stored in the memory 51 has a different compressing mode from the addressee compressing mode of the other terminal. In this case, the data of the memory 51 is first output to an expanding section 55 for restoring the data into its original form and then sent back to the compressing section 50, where the data is compressed with the addressee compressing mode for transmission.

The data receiving operation will be described below. When the facsimile apparatus on the other terminal inputs a line connecting command to the CPU 40, the CPU 40 executes line connection through the line connecting section 53. The received data is temporarily stored in the memory 51 through the sections 53 and 52 and then output to the expanding section 55. Then, the section 55 expands the received signal (a binary code compressed by the MR, MH or MMR mode) and outputs it to the printing section 2 as the image data. The printing section 2 converts the signal into an optical signal and records it on the paper $P_2$ as described before.

Although the CPU 40 controls the above sections through the control signal line 40a in the above, the control operation may be done from one section to another without through CPU 40. (The sections 1, 2, 50 through 53 and 55 will be referred to as controlled sections for easier explanation.)

The control section 4 (FIG. 3) comprises the CPU 40, a RAM 41 for storing information of the other terminal such as a directory number, line number and compressing mode, a timer IC 42 for setting transmission start time. When the above information is input from a key matrix 61 of a display 60 to the CPU 40, the CPU 40 writes it into or reads it from the RAM 41. The CPU 40 also displays various messages on an LCD display 68.

Figure 9:
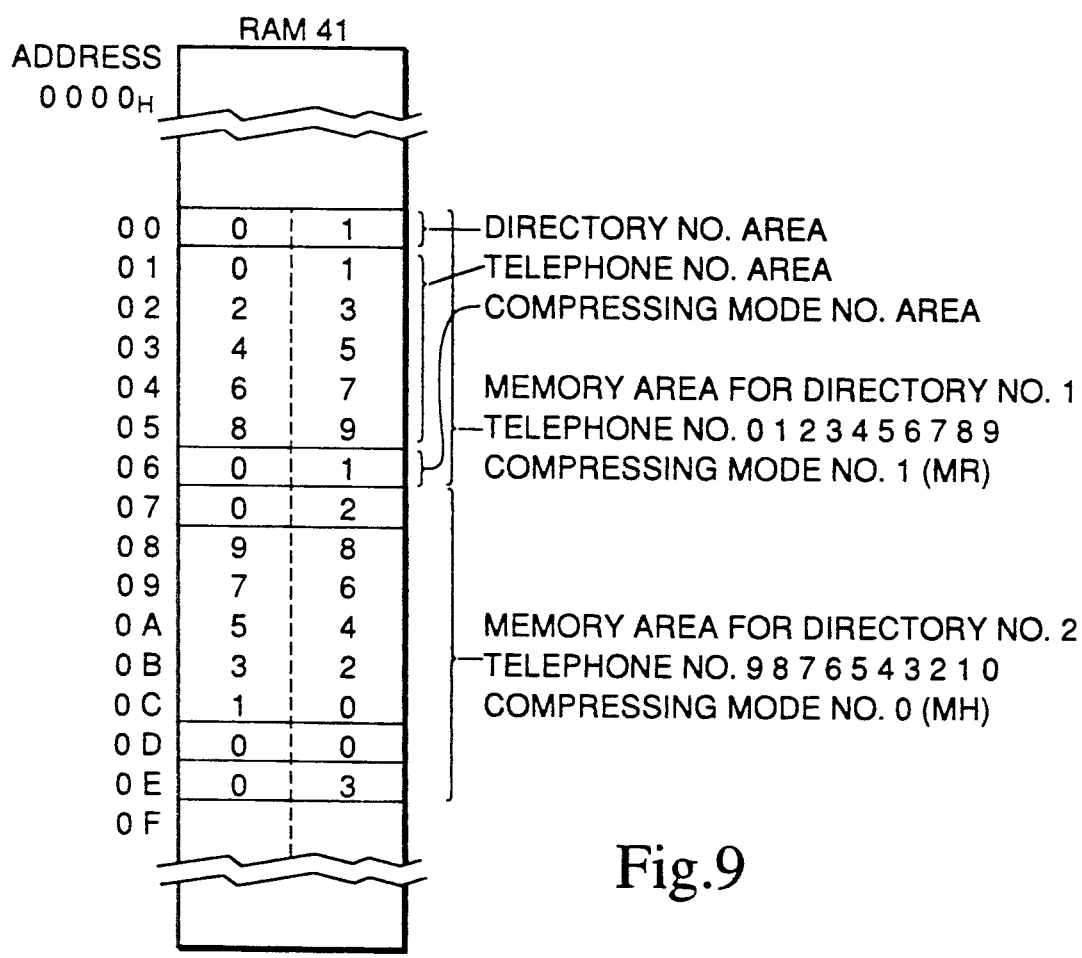
FIG. 9 shows an example of contents stored in a RAM 41 of the same.

As shown in FIG. 9, the RAM 41 has multiple memory areas, each having seven addresses such as addresses 00-06 or 07-0D. A first address of each area (00, 07, . . . ) is used as a directory number area, a second through a sixth addresses (01-05, 08-0C, . . . ) are as line number areas, and a seventh address (06, 0D, . . . ) is as a compressing mode number area. In FIG. 9, the addresses 00-06 store contents of directory number 1 and the addresses 07-0D store contents of directory number 2. More practically, address 00 stores "01" indicating the directory number is 1, addresses 01-05 store "0 1 2 3 4 5 6 7 8 9" indicating the line number of directory number 1, and address 06 stores "01" indicating the compressing mode of directory number 1 is MR. In the same way, address 02 stores "02" indicating the directory number is 2, address 08-0C store "0 9 8 7 6 5 4 3 2 1" indicating the line number of directory number 2, and address 0D stores "00" indicating the compressing number of directory number 2 is MH.

Figure 4:
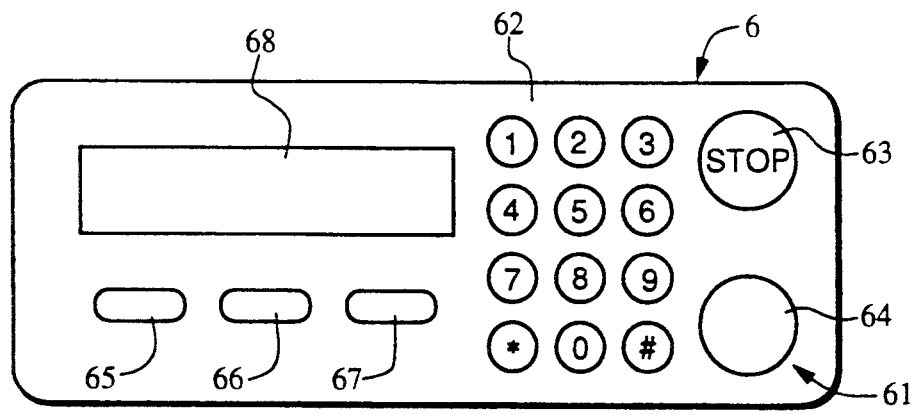
FIG. 4 is a plane view of a control panel 6 of the same.

As shown in FIG. 4, the display 60 comprises, for example, a control panel 6 having the key matrix 61 thereon. The key matrix 61 comprises ten keys 62, a STOP key 63 for stopping the operation of the facsimile apparatus, a transmitting key 64 for starting transmission, a register key 65 for putting the apparatus into a register mode, a multiple addressing key 66 for selecting a multiple addressing mode or registering the addressees for multiple addressing during a register mode, a mode key 67 for registering the compressing modes during the register mode, and keys * and #.

Figure 5:
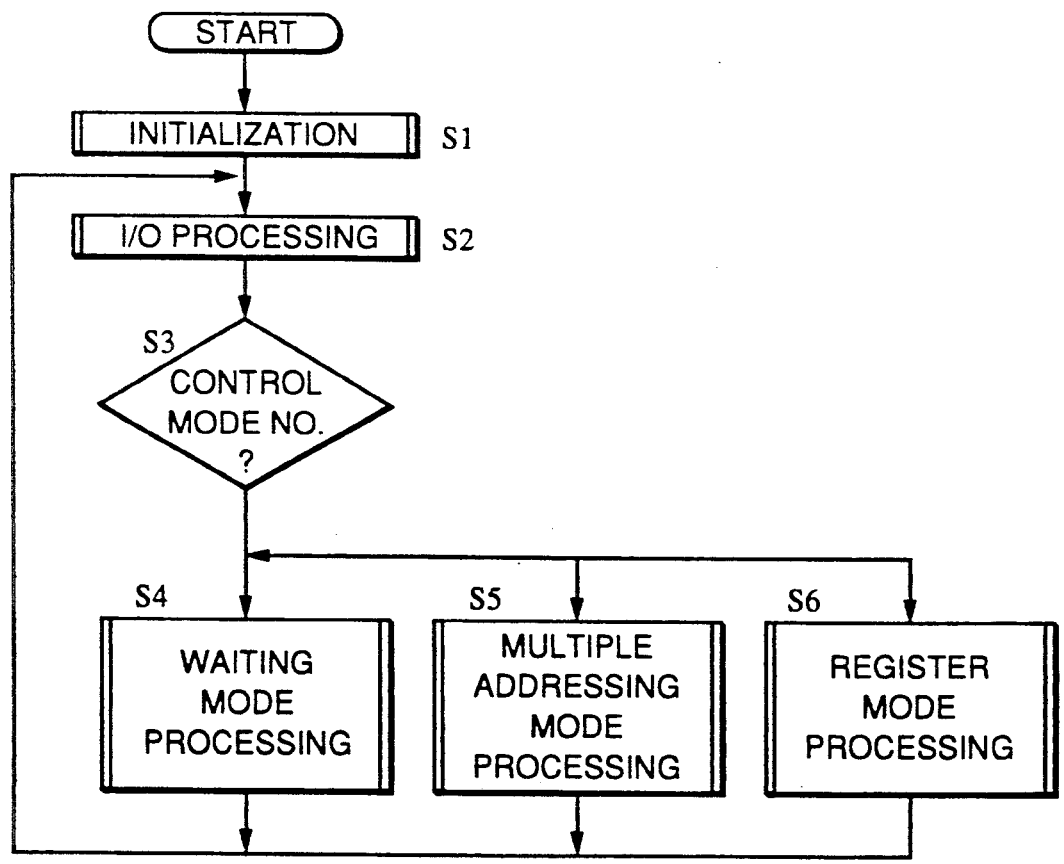
FIG. 5 is a flowchart showing a main routine of the same.

Multiple addressing will be described in detail hereinafter. Multiple addressing means transmitting the same data to multiple addressees by connecting the addresser with one addressee after another. For multiple addressing, the CPU 40 controls the above-mentioned controlled sections, a main routine of which operation is shown in FIG. 5.

The CPU 40 is initiated in a specified way (S1) and I/O processing from and to the key matrix 61, the reading section 1 and the printing section 2 is conducted (S2), thereafter the CPU 40 checks the control mode number stored in a work area of the RAM 41 (S3). The control mode number indicates the operation mode of the control section 4. The CPU 40 executes waiting mode processing when the control mode number is 0 (S4), multiple addressing mode processing when the number is 1 (S5), and register mode processing when the number is 2 (S6). After S4, S5 or S6, the operation goes back to S2.

In a waiting mode, the CPU 40 waits for commands from the key matrix 61 or a signal from the facsimile apparatus of the addressees. In the multiple addressing mode, the CPU 40 controls the controlled sections so as to execute multiple addressing. In the register mode, the addressees and compressing modes are registered.

Figure 6:
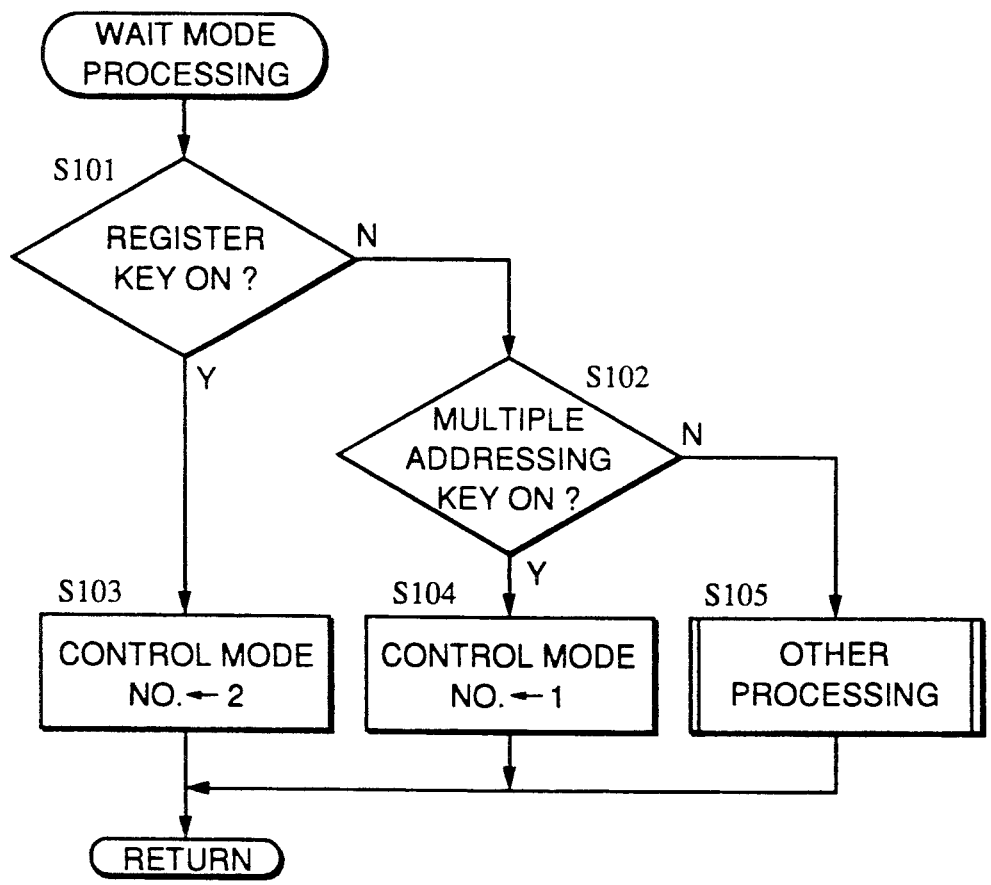
FIG. 6 is a flowchart showing a subroutine of waiting mode processing of the same.

FIG. 6 shows a subroutine of the waiting mode processing. In this mode, the CPU 40 detects which keys of the key matrix 61 are ON, whereby to execute the following operation.

When the register key 65 is turned on in S101, the control mode number is set 2 (S103) in order to put the apparatus into the register mode and the operation returns to the main routine. When the multiple addressing key 66 is turned on in S102, the control mode number is set 1 (S104) in order to put the apparatus into the multiple addressing mode and the operation returns to the main routine. When the register key 65 and the multiple addressing key 66 are both off, the operation goes to S105 for judging whether some of the ten keys 62 are on or not and executing necessary processing, thereafter the operation returns to the main routine.

Figure 7A:
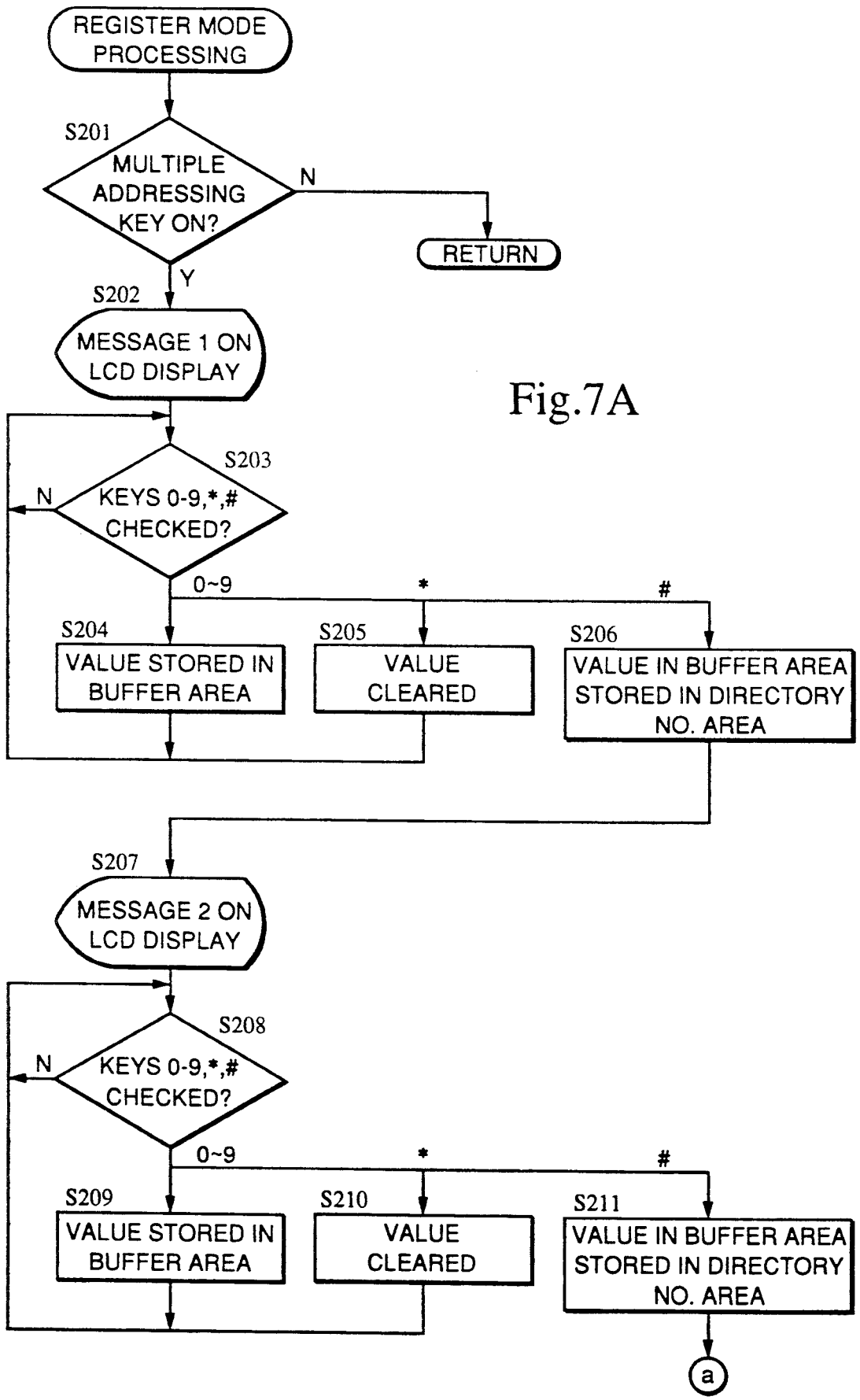
FIGS. 7a and 7b form a flowchart showing a subroutine of register mode processing of the same.
Figure 7B:
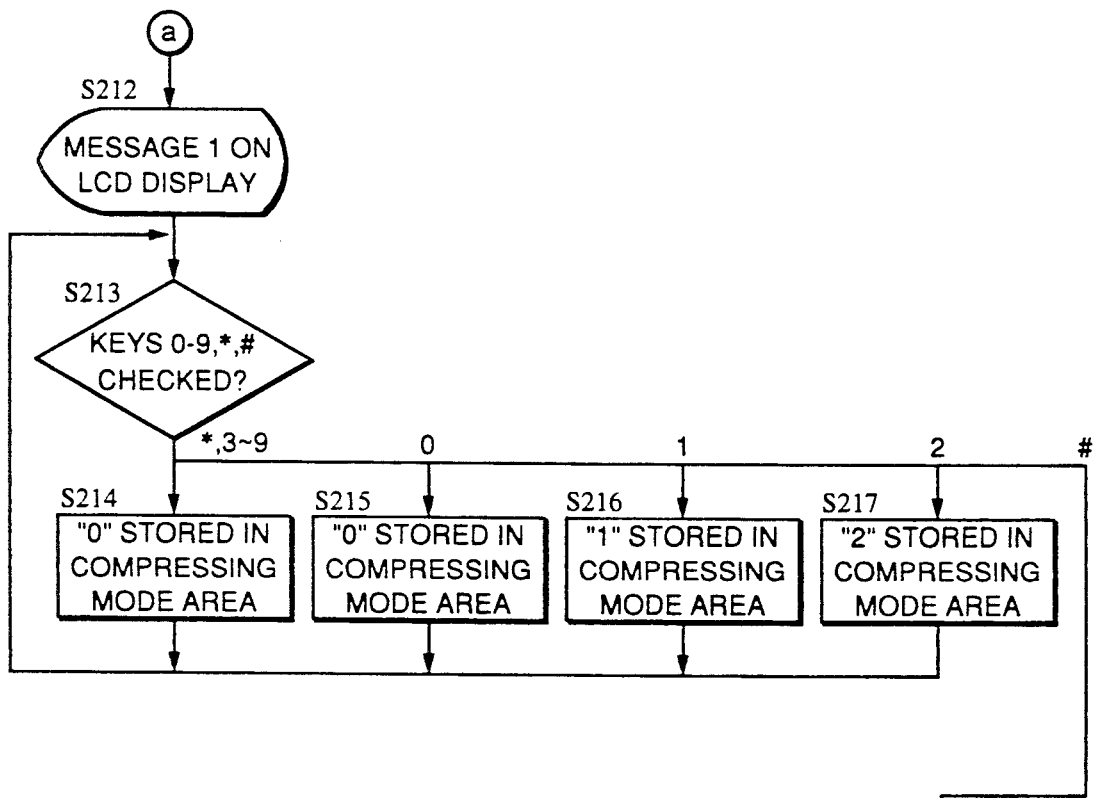
Figure 7B:
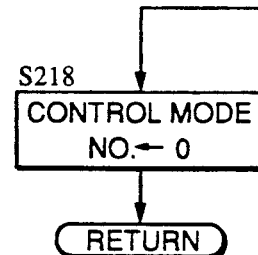

FIGS. 7a and 7b show a subroutine of the register mode processing.

When the multiple addressing key 66 is turned on in S201, the LCD display 68 displays Message 1 (FIG. 8a) "Input the directory number" (S202). Then, which keys among the ten keys 62 and the * and # keys are turned on is detected in S203, and the operation advances to the next step in accordance with the keys are turned on.

When some of the ten keys 62 are turned on, the input value indicated by the keys is stored in a buffer area of the CPU 40 (S204). When the * key is turned on, the value stored in the buffer area is cleared (S205). If the key to turn on is 2 but the 1 key is turned on by mistake, the input of 1 is cancelled by pushing the * key so that the 2 key may be turned on. When the # key is turned on, the value stored in the buffer area is stored in the directory number area as the directory number (S206). Practically, if the value stored in the buffer area is n, this value is stored in the address (n−1)×7 (the directory number area of the n'th memory area).

Instead of n, the directory number may be some other value which indicates that area is not blank.

The value may be stored in the directory number area of the smallest-numbered memory area among the blank memory areas.

How a line number is registered will be explained hereinafter. After S206, the operation goes to S207, where the LCD display 68 displays Message 2 (FIG. 8b) "Input the line number". After some of the ten keys 62 are turned on as the line number, the number is stored in a buffer area (S209). When the * key is turned on, the number is cleared (S210). When the # key is turned on, the number is stored in a line number area following the above directory number area (S211). In this way, the directory number and the corresponding line number are registered consecutively.

How a compressing mode number is registered will be explained. After S211, the operation goes to S212, where the LCD display 68 displays Message 3 (FIG. 8c) "Input the compressing mode number. MH=0, MR=1, MMR=2". When the * key and some of the 3 to 9 keys are turned on, "0" is stored in a compressing mode number area following the above line number area (S214), "0" indicating the MH mode. Also when the 0 key is turned on, "0" is stored in the above area (S215). When the 1 key is turned on, "1" indicating the MR mode is stored in the above area (S216). When the 2 key is turned on, "2" indicating the MMR mode is stored in. the above area (S217). When the # key is turned on, the value stored in the compressing mode number area is left as it is but the control mode number stored in the work area of the RAM 41 is set 0 in order to put the apparatus into the waiting mode, and the operation returns to the main routine.

Figure 10:
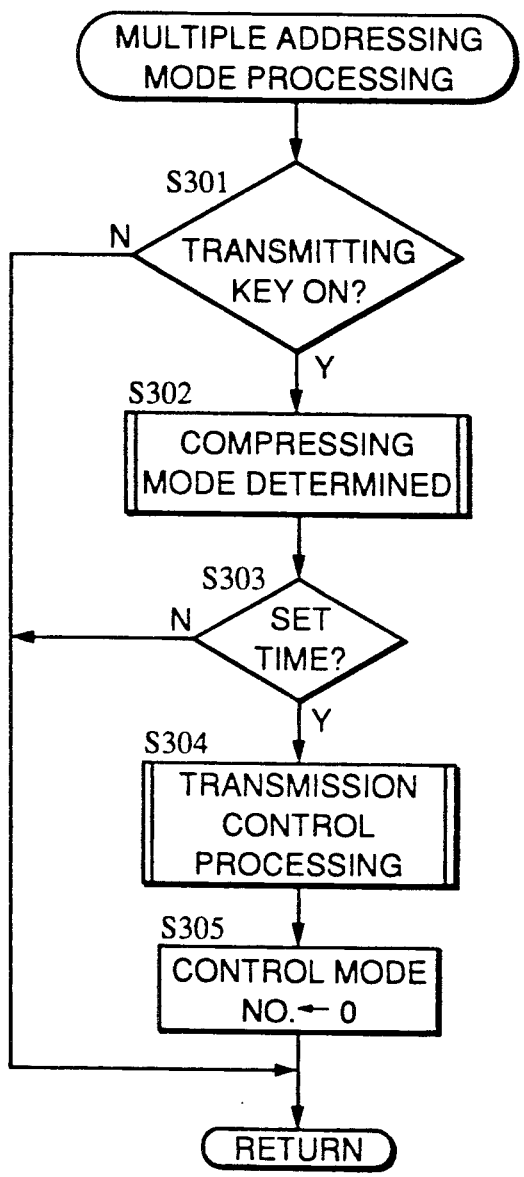
FIG. 10 is a flowchart showing a subroutine of multiple addressing mode processing of the same.

FIG. 10 shows a subroutine of the multiple addressing mode processing. The CPU 40 judges whether the transmitting key 64 has already been turned on or not, namely, whether it is set to start transmitting at a specified time or not (S301). If so, a first, second and third compressing modes are determined as described below (S302). Then, the CPU 40 judges whether the above specified time has come or not based on a signal from the timer IC 42 (S303), and if not, the operation returns to the main routine or repeats the judgment. This judgment may be done immediately after S301. This judgment is not necessary if the data is transmitted immediately after the transmitting key 64 is turned on. When the CPU 40 judges that the specified time has come, transmission control processing is executed (S304). After the transmission control processing is finished, the control mode number is set 0 in order to put the apparatus into the waiting mode (S305) and the operation returns to the main routine.

Figure 11A:
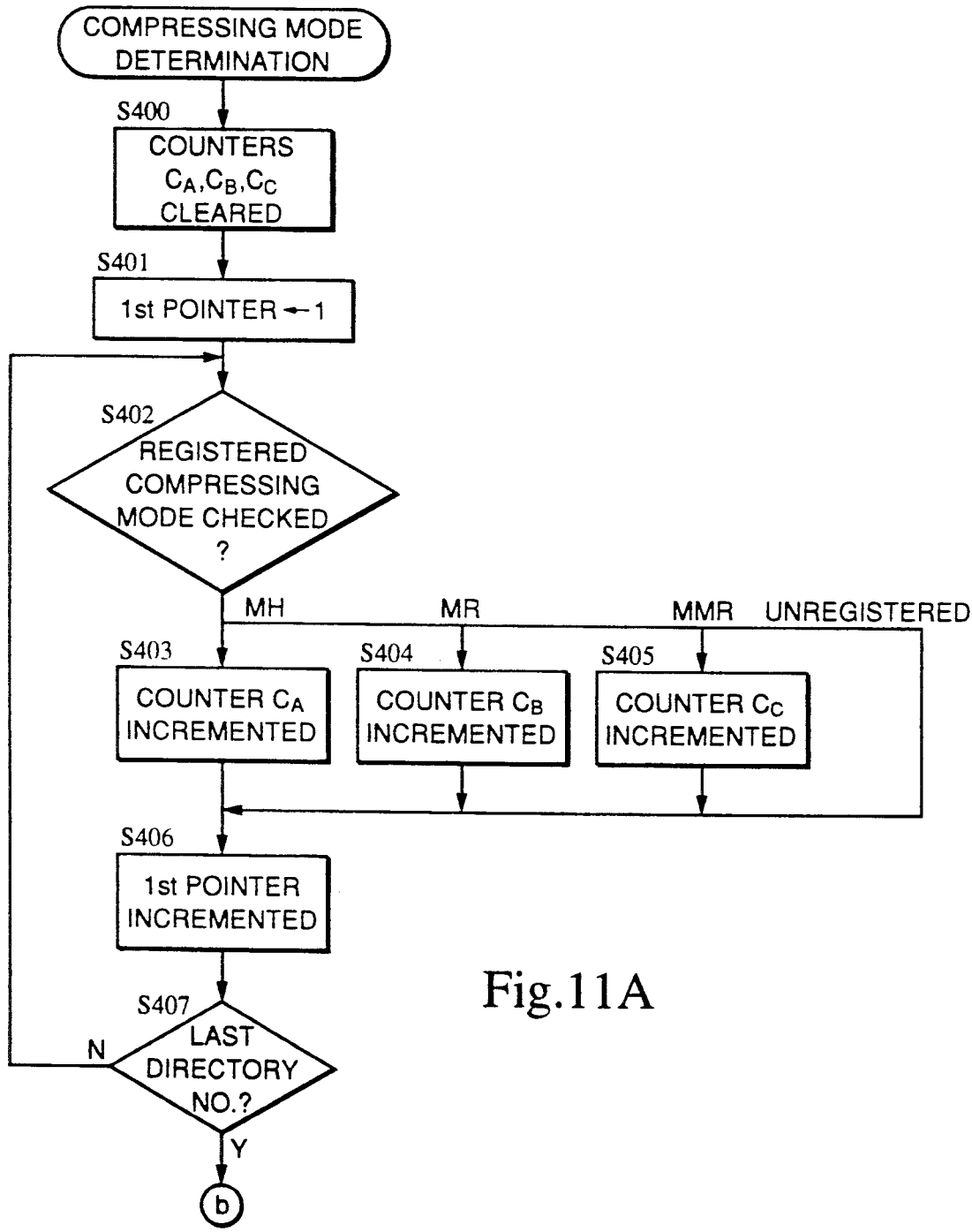
FIGS. 11a and 11b form a flowchart showing a subroutine of compressing mode determination of the same.
Figure 11B:
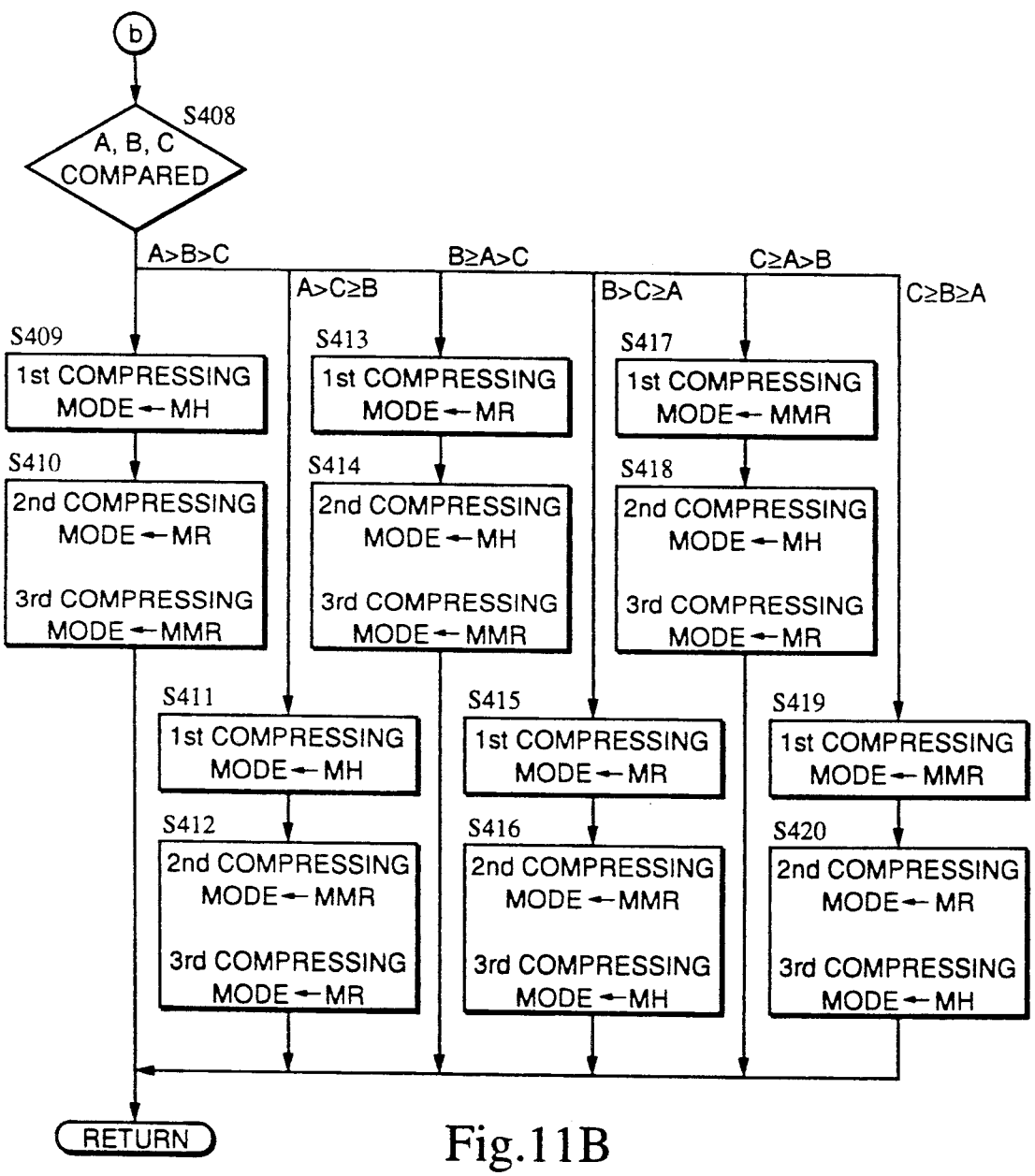

The compressing mode determination is executed in the following way. The CPU 40 has therein three counters $C_A$, $C_B$ and $C_C$ (FIG. 3), which respectively count the numbers of the compressing modes stored in the RAM 41. The results are used to determine the first, second and third compressing modes as shown in FIGS. 11a and 11b.

The CPU 40 clears all the contents of the counters $C_A$, $C_B$ and $C_C$ (S400) and a directory number retrieval pointer (referred to as the first pointer) is set 1 (S401). Then, which compressing mode is registered together with the directory number 1 (corresponding with the value of the first pointer) is checked (S402). If the mode is MH, the counter $C_A$ is incremented (S403); if the mode is MR, the counter $C_B$ is incremented (S404); and if the mode is MMR, the counter $C_C$ is incremented (S405). Each time one of the counters is incremented, the first pointer is incremented (S406). Then, whether all the directory numbers have been retrieved or not is judged (S407). The operation of S402 through 407 is repeated until all the directory numbers are retrieved. On confirming retrieval of all the directory numbers, the operation goes to S408, where a value A of the counter $C_A$, another value B of the counter $C_B$, and still another value C of the counter $C_C$ are compared. In other words, the numbers of addressees registered with the MH, MR and MMR modes are compared.

If A>B>C, namely, if the number of the addressees registered with the MH mode is largest, MH is set as the first compressing mode (S409), MR as the second compressing mode and MMR as the third compressing mode (S410). The first, second and third modes are used for transmission in this order. If A>C≧B, MH is set as the first mode (S411), MMR as the second and MR as the third (S412). If B≧A>C, MR is set as the first mode (S413), MH as the second and MMR as the third (S414). If B>C≧A, MR is set as the first mode (S415), MMR as the second and MH as the third (S416). If C≧A>B, MMR is set as the first mode (S417), MH as the second and MR as the third (S418). If C≧B≧A, MMR is set as the first mode (S419), MR as the second and MH as the third (S420).

On completing the above setting, the operation returns to the subroutine of multiple addressing mode processing. The relationship between the values of the counters $C_A$, $C_B$ and $C_C$ and the compressing modes is mentioned in Table 1.

TABLE 1

| Counter | Compressing modes | | |
|---|---|---|---|
| | 1st | 2nd | 3rd |
| A > B > C | MH | MR | MMR |
| A > C ≧ B | MH | MMR | MR |
| B ≧ A > C | MR | MH | MMR |
| B > C ≧ A | MR | MMR | MH |
| C ≧ A > B | MMR | MH | MR |
| C ≧ B ≧ A | MMR | MR | MH |

As apparent from the above, when some or all of A, B, and C have the same value, the compressing mode having the higher or highest compressing ratio may be given the priority.

Figure 12A:
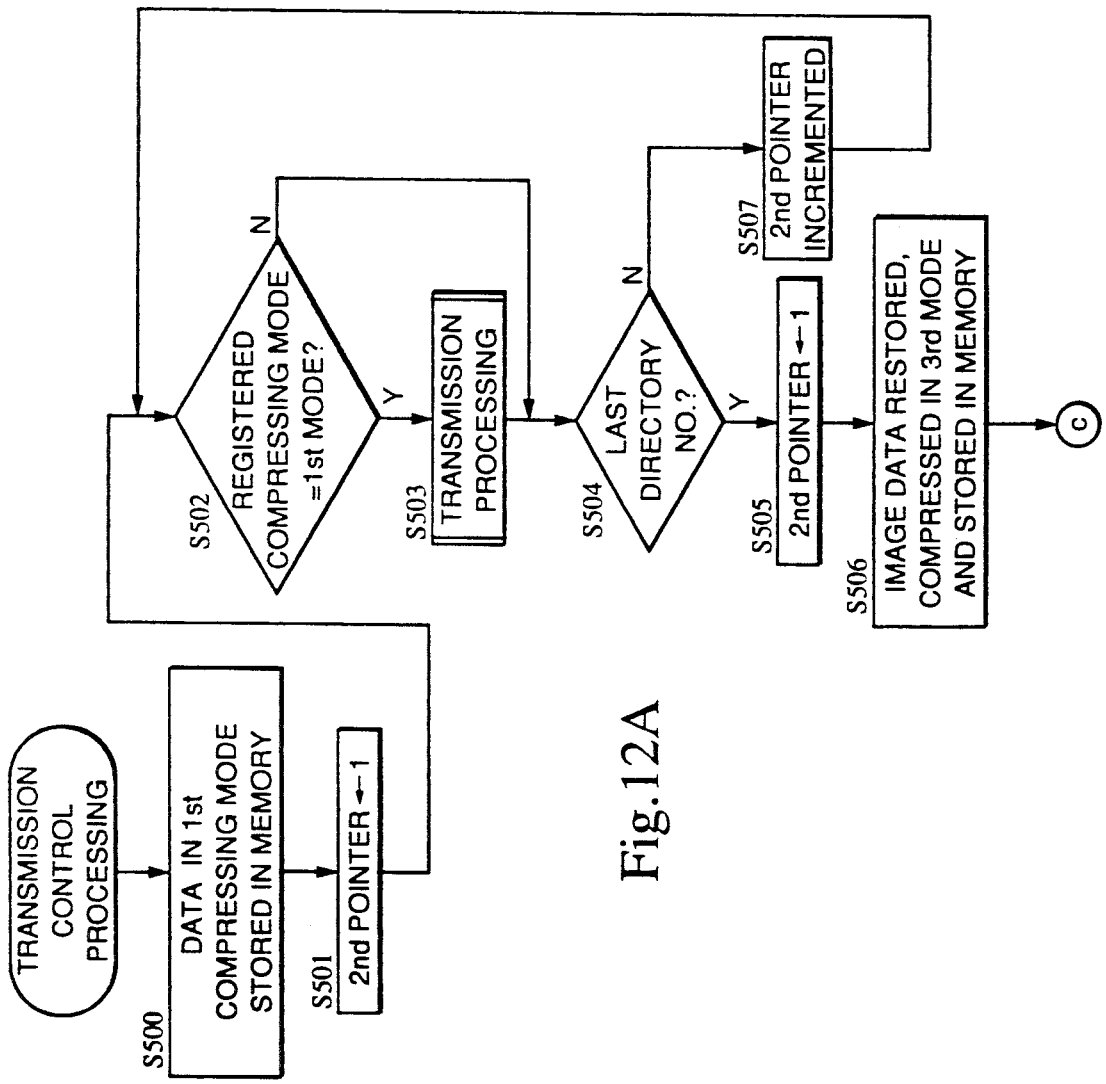
FIGS. 12A and 12B form a flowchart showing a subroutine of transmission control processing of the same.
Figure 12B:
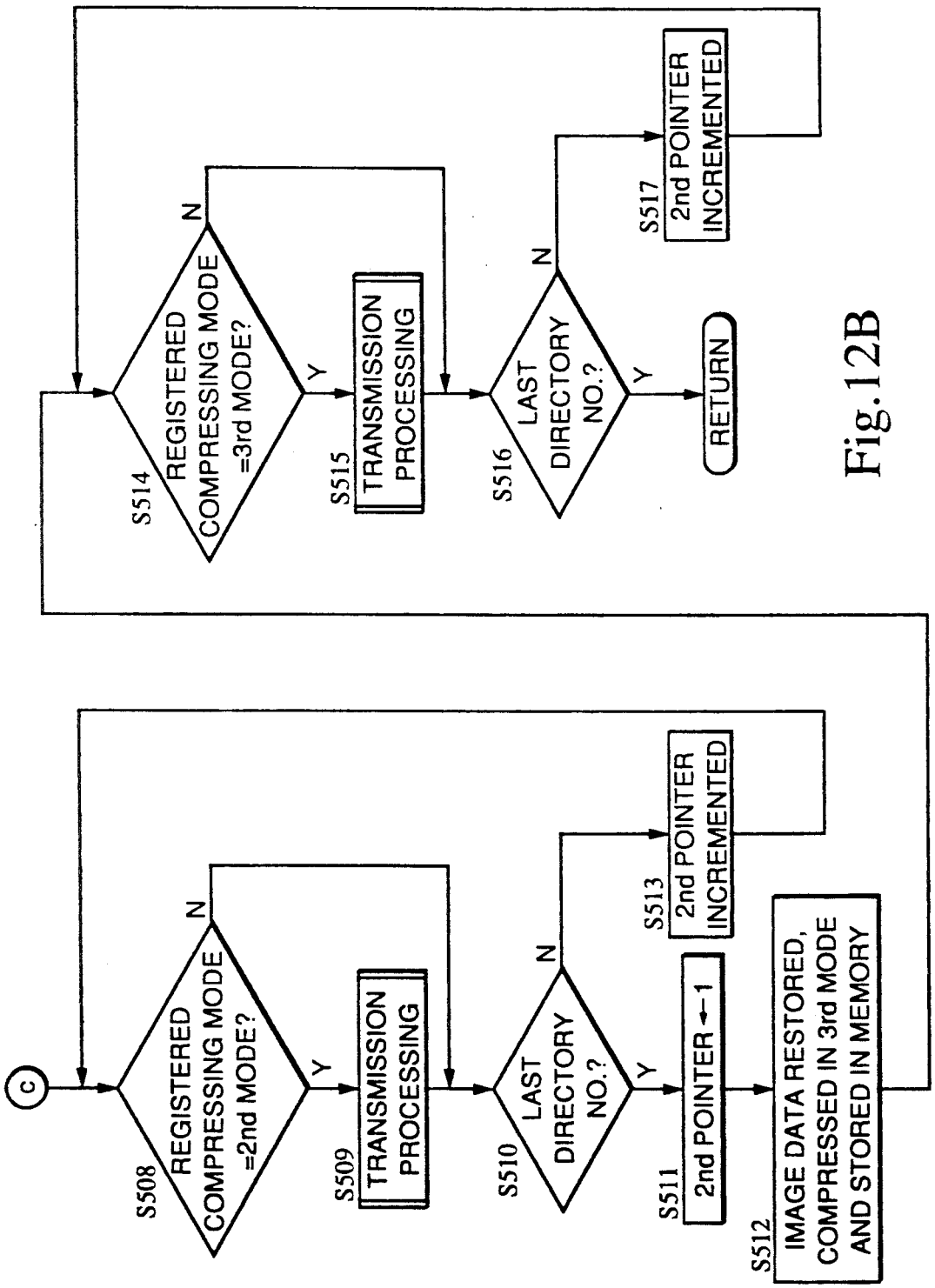

A subroutine of transmission control processing will be described referring to FIGS. 12A and 12B. The image data read out by the reading section 1 is compressed in the compressing mode and stored in the memory 51 (S500). Then, another directory number retrieval pointer (referred to as the second pointer) is set 1 (S501). The CPU 40 judges whether or not the compressing mode which is registered together with the directory number 1 (corresponding with the value of the second pointer) is the same as the first compressing mode (S502). If so, the data in the memory 51 is transmitted to the addressees registered with that compressing mode (S503) and the operation advances to S504. If not, the operation directly goes to S504. In S504, the CPU 40 judges whether all the directory numbers are retrieved or not, and if not, the second pointer is incremented (S507). The operation of S502 through S504 and S507 is repeated until the image data is transmitted to all the addressees registered with the first compressing mode. If so in S504, the operation advances to S505.

After S505, the image data is transmitted to the addressees registered with the second compressing mode as explained below.

The second pointer is set 1 (S505), and the image data in the memory 51 is restored to the original form by the expanding section 55, thereafter the data is compressed with the second compressing mode and stored in the memory 51 (S506). After that, the data is transmitted to the addressees registered with the second compressing mode as in S502 through 504 and S507 (S508 through S510 and S513).

After the above transmission is finished, the data is transmitted to the addressees registered with the third compressing mode in the same way (S514 through S517).

When transmission to all the addressees is finished, the operation returns to the subroutine of multiple addressing mode processing.

Embodiment II

Figure 13:
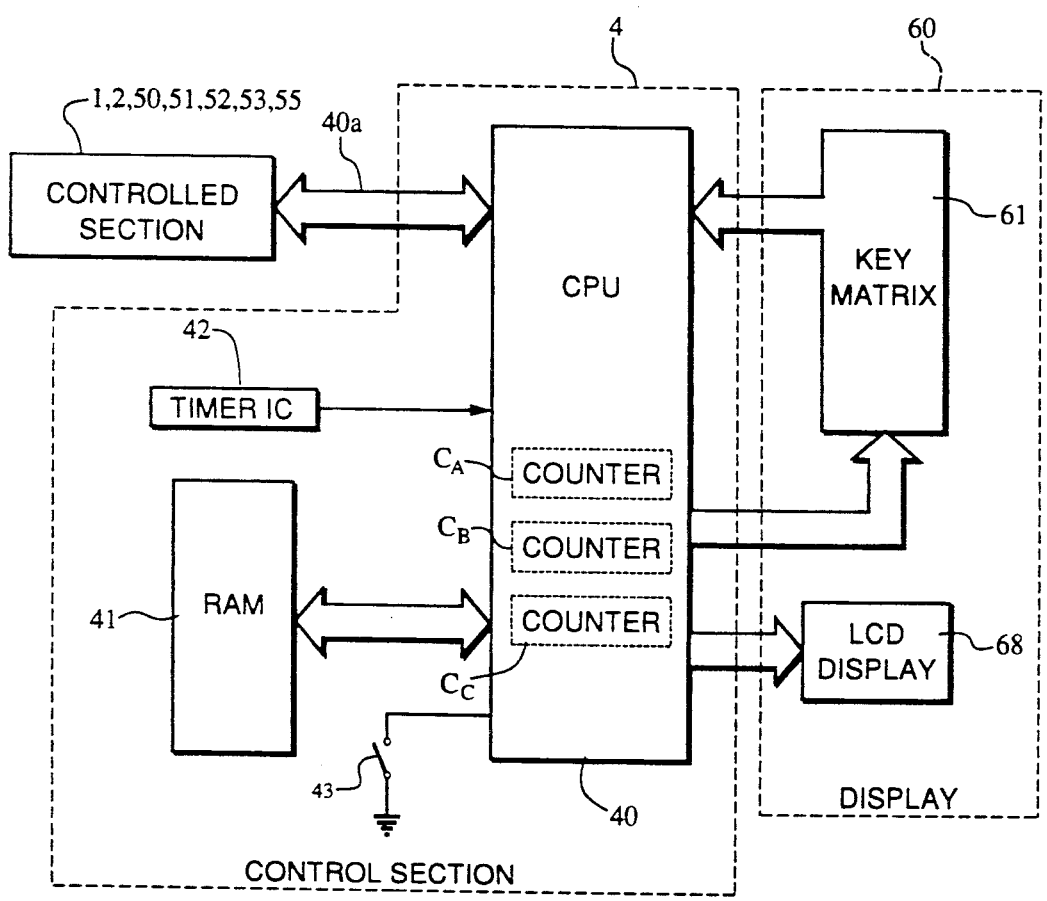
FIG. 13 is a block diagram showing a control section 4 as a core of the data transmitting/receiving system of a second embodiment according to this invention.

A second embodiment is different from the first embodiment only in that the control section 4 is equipped with a switch 43 (FIG. 13) and that the control section 4 operates in a slightly different way. The identical construction and operation as those of the first embodiment will be omitted.

When the compressing mode is changed by, for example, apparatus replacement on the other terminal, the switch 43 switches to effect or not a function for automatically changing the present compressing mode into another one. The switch 43 comprises a DIP switch provided in the apparatus.

The second embodiment is operated in the same way as the first embodiment in the main routine, the subroutine of waiting mode processing and the subroutine of multiple addressing mode processing (FIGS. 5, 6 and 10), but differently in the subroutines of register mode processing, compressing mode determination and transmission control processing.

Figure 14:
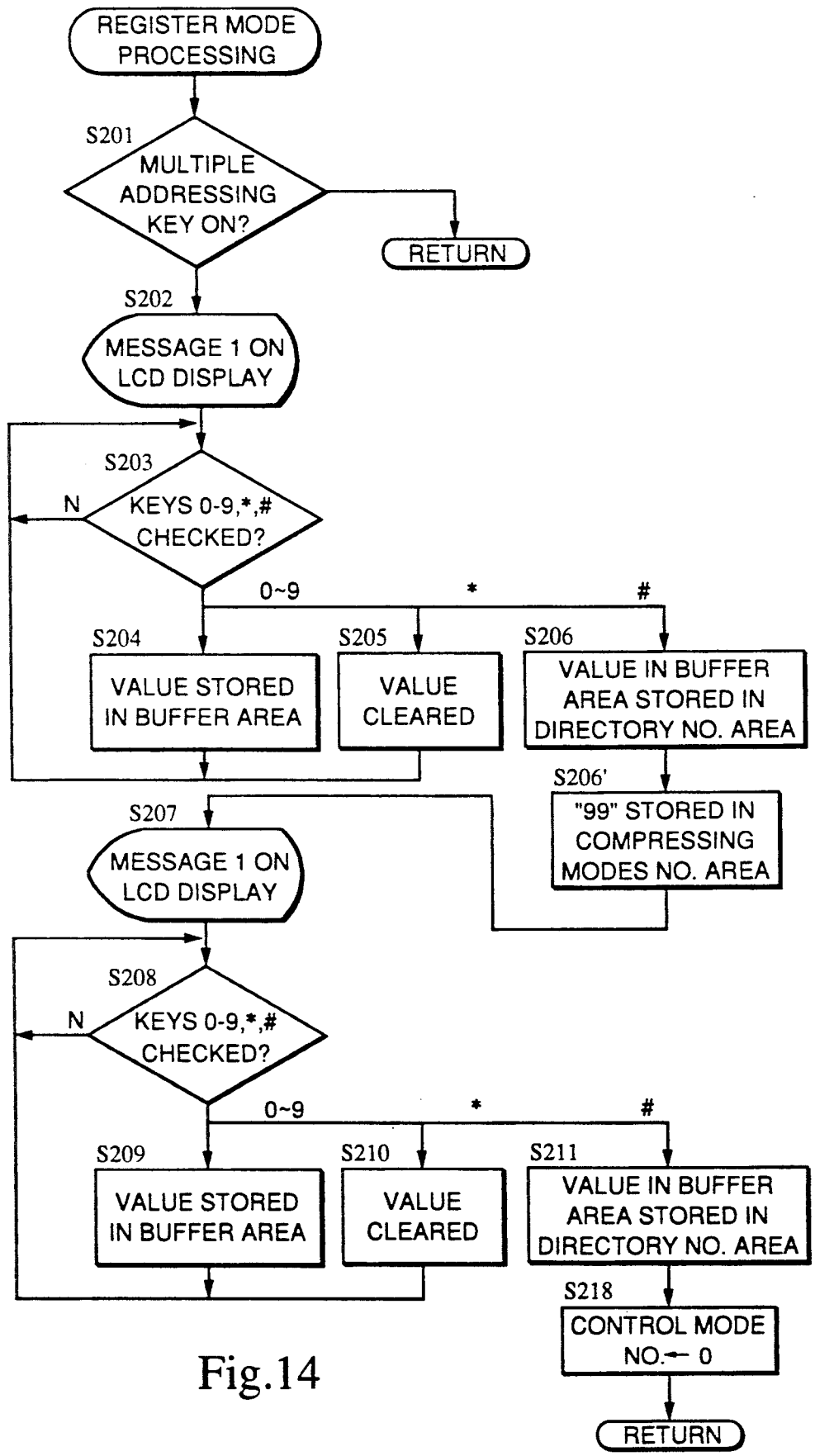
FIG. 14 is a flowchart showing a subroutine of register mode processing of the same.

As shown in FIG. 14, the register mode processing subroutine is the same as that of the first embodiment (FIGS. 7a and 7b) except that S206' is added. After the directory number is stored in the directory number area of the RAM 41 in S206, a value, for example, "99" is stored in the compressing mode number area (S206'). The value "99" indicates that no compressing mode number is registered in this area. As will be described later, when the data is transmitted to an addressee, a value corresponding with the addressee compressing mode of that addressee (Table 1) is stored in this compressing mode number area. Usable instead of "99" is "255", which is a maximum value of 8-bit binary code. After the line number is registered in S207 through S211 (same as in FIGS. 7a and 7b), the control mode number is set 0 (S218) and the operation returns to the main routine without registering the compressing mode number. Therefore, Message 3 (FIG. 8) is not displayed.

Figure 15A:
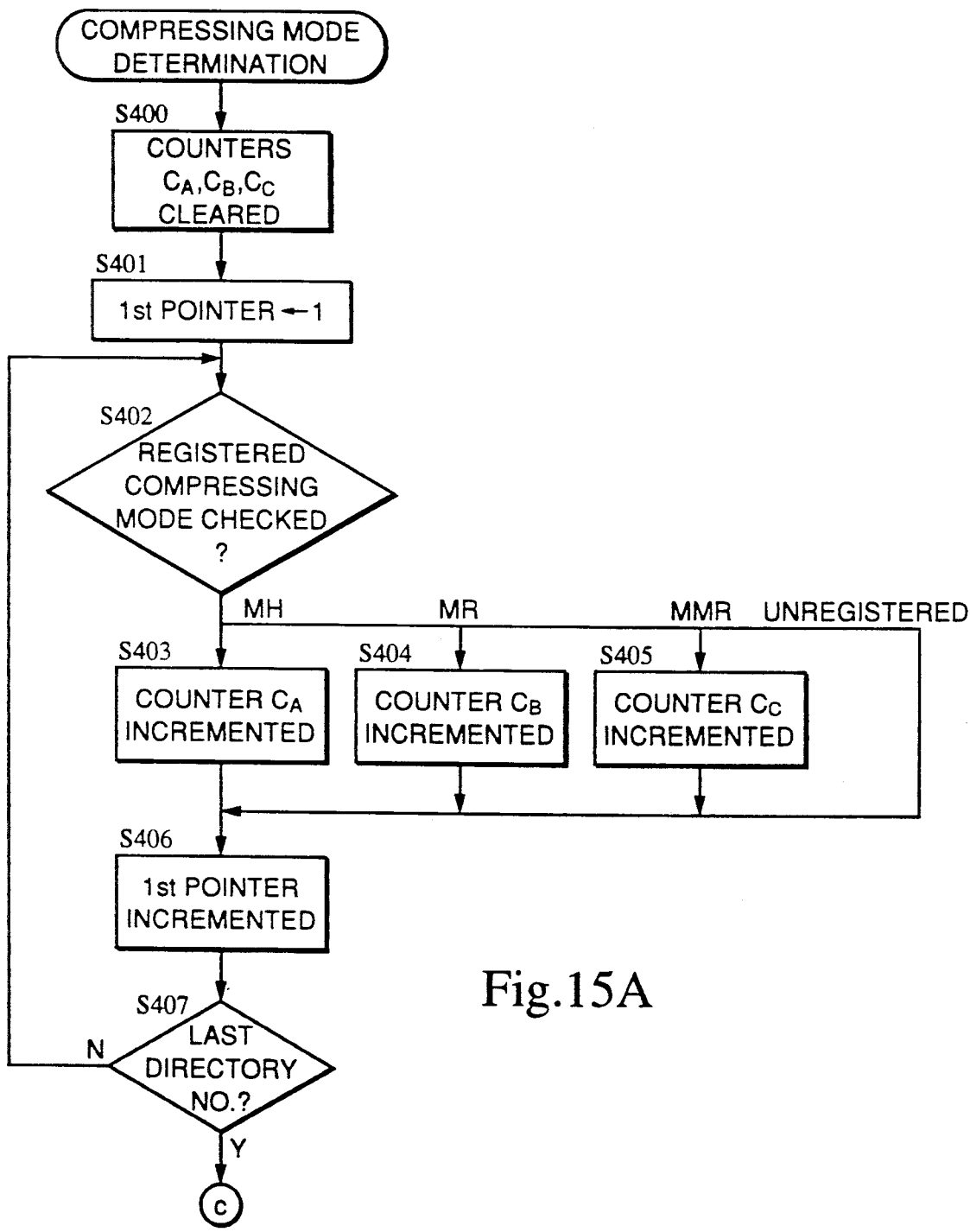
FIGS. 15a and 15b form a flowchart of showing a subroutine of compressing mode determination processing of the same.
Figure 15B:
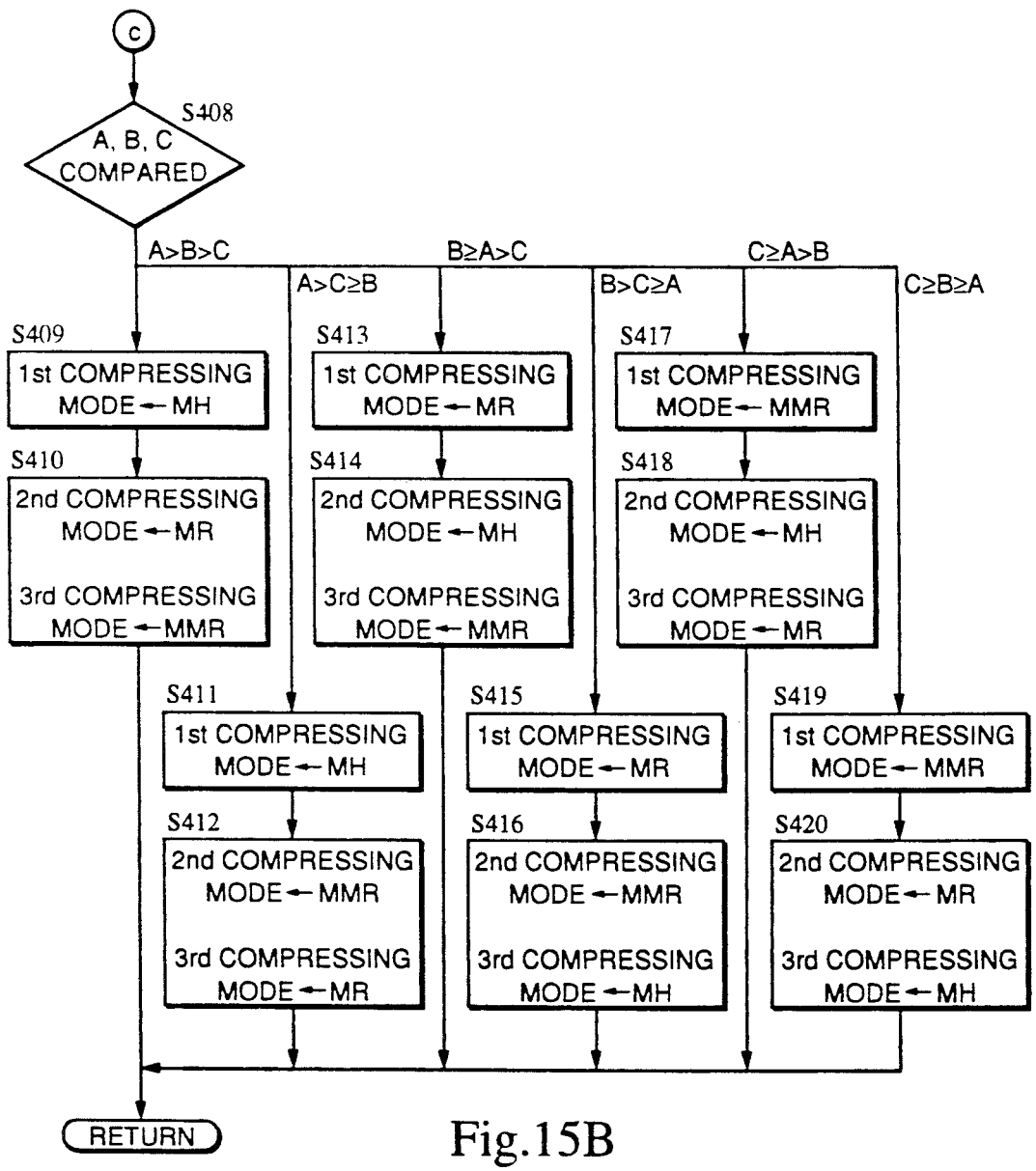

As shown in FIGS. 15a and 15b, the subroutine of compressing mode determination is operated differently from that of FIGS. 11a and 11b in S402 and thereafter.

After the first pointer is set 1 (S401), which compressing mode is registered with the directory number 1 (corresponding with the value of the first pointer) is checked. In addition, whether any compressing mode is registered with that directory number or not is judged. If not, that means the addressee registered with the directory number 1 is a new one. The new addressee is ignored for compressing mode determination. Therefore, the operation goes to S406 without incrementing any counter $C_A$, $C_B$ or $C_C$.

Figure 16A:
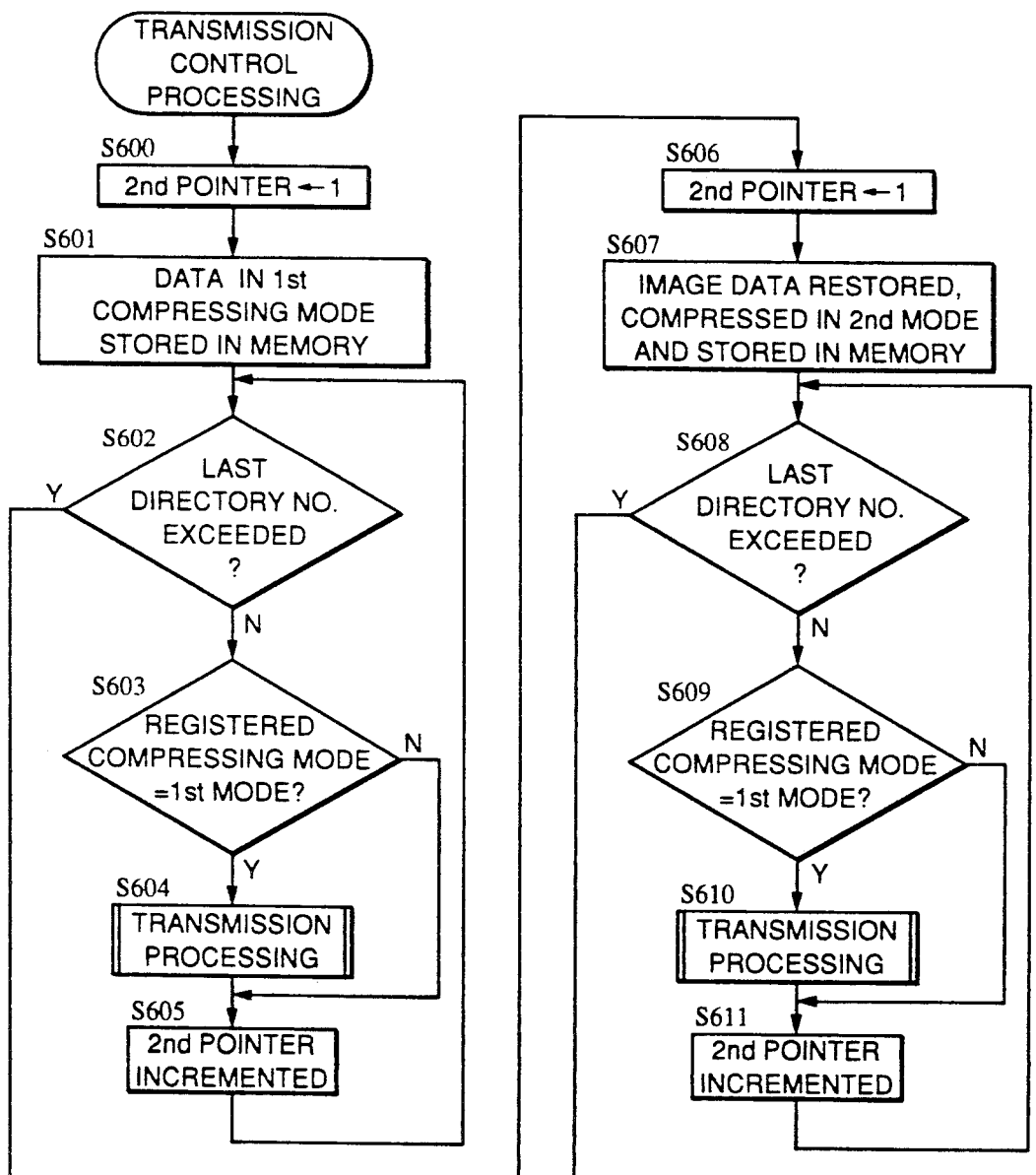
FIGS. 16a and 16b is a flowchart showing a subroutine of transmission control processing of the same.
Figure 16B:
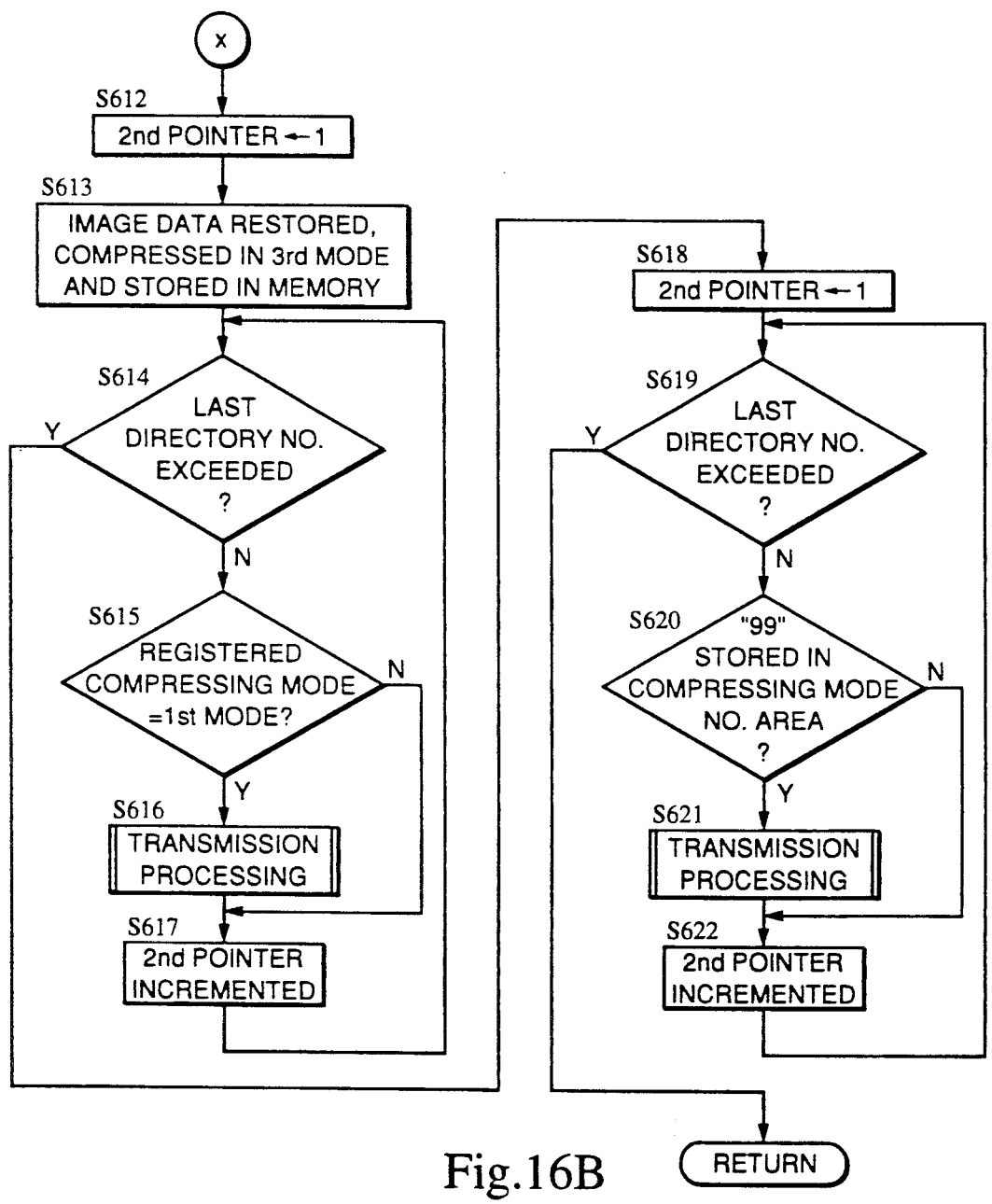

The subroutine of transmission control processing will be described referring to FIGS. 16a and 16b hereinafter.

The second pointer is set 1 (S600). The data read by the reading section 1 is compressed with the compressing mode and is stored in the memory 51 (S601). Then, whether all the directory numbers have been retrieved or not is judged (S602), and if not, whether the compressing mode registered with the directory number 1 (corresponding with the value of the second pointer) is the same as the first compressing mode or not is judged (S603). If not, the operation directly advances to S605 without transmission processing. If so in S603, transmission processing is executed (S604) and the operation advances to S605. After the second pointer is incremented in S605, the operation goes back to S602, thereafter the operation of S602 through S605 is repeated, whereby transmission is executed to all the addressees registered with the first compressing mode. On confirming all the directory numbers have been retrieved, the operation advances to S606.

Next, transmission is executed to the addressees registered with the second compressing mode. The second pointer is set 1 (S606), and the image data is restored to its original form in the expanding section 55 and compressed with the second compressing mode to be stored in the memory 51 (S607). Then, the data is transmitted to the addressees registered with the second compressing mode as in S602 through S605 (S606 through S611). On finishing transmission to all the addressees registered with the second compressing mode, transmission to the addressees registered with the third compressing mode is executed in the same manner (S612 through S617).

In S618 through S622, transmission is executed to new addressees whose line numbers are registered not but compressing modes. Whether "99" is stored in each compressing mode number area or not is judged (S620). If not, transmission is executed. After transmission is completed to all the addressees, the operation returns to the subroutine of multiple addressing mode processing.

Figure 17:
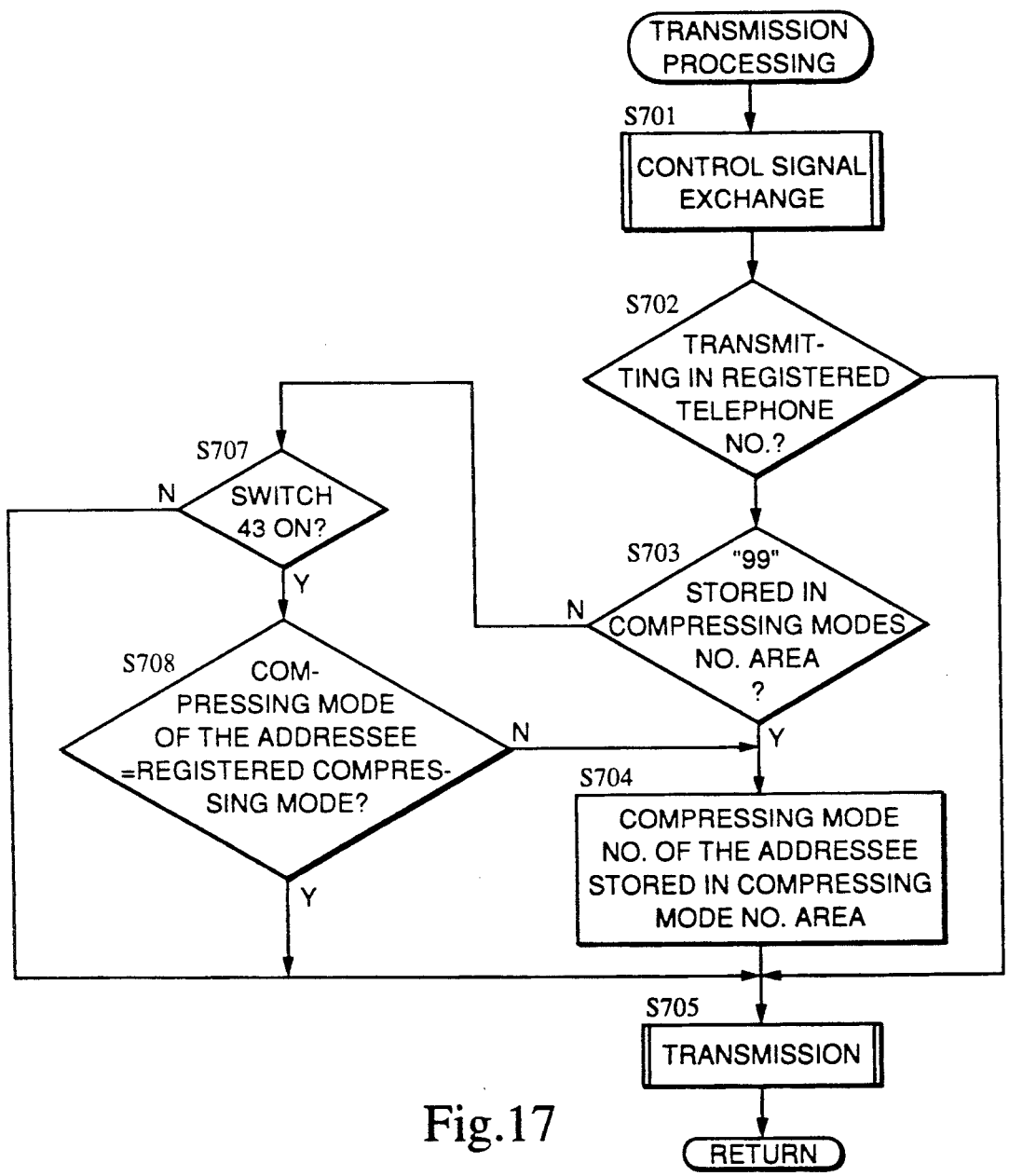
FIG. 17 is a flowchart showing a subroutine of transmission processing of the same.

The subroutine of transmission processing will be described referring to FIG. 17. This subroutine is used when the line number and the compressing mode number are registered, when only the line number is registered, or neither of them is registered (manual dialing).

After the line number of the addressee is dialed and the line connection is conducted, specified control signals are exchanged (S701), whereby the addressee compressing mode is read out based on the bit information in the frame data using the DIS (digital identification signal) sent from the addressee. Then, DTC (digital transmit command) is sent to the addressee.

After that, whether the line connection was conducted based on the registered line number or by manual dialing is judged (S702). If by manual dialing, the operation goes to S705 where transmission is executed using the addressee compressing mode obtained in S701 without registering it. If based on the registered line number, whether "99" is stored in the compressing mode number area corresponding to the line number or not is judged (S703). If so, the addressee compressing mode is stored in that compressing mode number area (S704). In this way, the addressee compressing mode is automatically registered when the first transmission is executed to that addressee only by registering the line number. After that, the image data is transmitted (S705). If necessary, the data stored in the memory 51 is expanded and compressed so that the data may correspond to the addressee compressing mode before the transmission. Then, operation returns to the subroutine of transmission control processing.

If the addressee compressing mode is registered in S703, whether the switch 43 is ON or OFF is judged (S707). If ON, the operation advances to S708, where whether the addressee compressing mode is the same as the registered compressing mode or not is judged. If not, a new compressing mode number is stored (S704). After that, the data in the memory 51 is expanded in the expanding section 55, compressed with the addressee compressing mode obtained in S701 and transmitted (S705). If the two compressing modes are the same in S708 or if the switch 43 is OFF in S707, the data is transmitted in S705.

Although the multiple addressing has been explained with the facsimile apparatus according to this invention in the above embodiments, the multiple addressing may be applied to any form of transmission which is conducted by storing line numbers, for example, redialing or coded dialing. Or the multiple addressing may be executed based on information on addressees such as recording paper size or vertical resolution as well as compressing mode.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A facsimile apparatus comprising:
   document image reading means for forming an image data corresponding to a document image;
   data compressing means having multiple compressing modes for compressing the image data;
   memory means having multiple memory areas, each of which stores information on a facsimile apparatus of an addressee, the above information comprising at least a line number and an addressee compressing mode;
   selecting means for selecting a compressing mode corresponding to an addressee compressing mode which is stored in the largest number among the addressee compressing modes stored in said memory means;
   controlling means for controlling compressing means to compress the image data with the compressing mode selected by said selecting means; and
   transmitting means for transmitting the image data compressed by said data compressing means.

2. A facsimile apparatus of claim 1, further comprising second memory means for storing the image data compressed with the compressing mode selected by said selecting means, wherein said transmitting means transmits the image data stored in the second memory means to the addressee corresponding to the compressing mode selected by said selecting means.

3. A facsimile apparatus comprising:
   document image reading means for forming an image data corresponding to a document image;
   data compressing means having multiple compressing modes for compressing the image data;
   memory means having multiple memory areas, each of which stores information on a facsimile apparatus of an addressee, the above information comprising at least a line number and an addressee compressing mode;
   selecting means for selecting a compressing mode corresponding to an addressee compressing mode which is stored in the largest number among the addressee compressing modes stored in said memory means;
   controlling means for controlling said data compressing means to compress the image data with the compressing mode selected by said selecting means; and
   transmitting means for transmitting the image data compressed by said data compressing means to the addressee corresponding to the compressing mode selected by said selecting means.

4. A facsimile apparatus of claim 3, wherein said selecting means selects a second compressing mode corresponding to an addressee compressing mode which is stored in the second largest number among the addressee compressing modes stored in said memory means, said controlling means controls said data compressing means to compress the image data with the second compressing mode after said transmitting means transmits the image data with the compressing mode selected prior to the second compressing mode, and said transmitting means transmits the image data compressed with the second compressing mode to the addressee corresponding to the second compressing mode.

5. A facsimile apparatus comprising:
   document image reading means for forming an image data corresponding to a document image;
   data compressing means having multiple compressing modes for compressing the image data;
   first memory means having multiple memory areas, each of which stores information on a facsimile apparatus of an addressee, the above information comprising at least a line number and an addressee compressing mode;
   first selecting for selecting an addressee;
   second selecting means for selecting a compressing mode corresponding to the addressee compressing mode of the addressee selected by said first selecting means;
   controlling means for controlling said data compressing means to compress the image data with the compressing mode selected by said second selecting means;
   second memory means for storing the image data compressed by said data compressing means;
   comparing means for comparing the compressing mode with which the image data stored in said second memory means has been compressed and the compressing mode corresponding to the addressee selected by said first selecting means; and
   transmitting means for transmitting the image data stored in said second memory means to the addressee selected by said first selecting means when the two compressing modes compared by said comparing means are the same.

6. A facsimile apparatus of claim 5, wherein said transmitting means, when the above two compressing modes compared by said comparing means are different from each other, transmits the image data stored in said second memory means after the image data is compressed with the latter compressing mode.

7. A facsimile apparatus comprising:
   document image reading means for forming an image data corresponding to a document image;
   data processing means having multiple data processing modes for processing the image data with the mode selected;
   memory means having multiple memory register areas, each of which stores information on a facsimile apparatus of an addressee, the above information comprising at least a line number and an addressee data processing mode;
   selecting means for selecting an addressee;
   calling means for calling the addressee selected by said selecting means;
   controlling means for controlling said data processing means to process the image data, when the data processing mode related with the addressee selected by said selecting means is stored in said memory means, with the data processing mode stored in said memory means; and
   transmitting means for transmitting the image data processed by said data processing means to the addressee called by said calling means, wherein said apparatus further comprises
   discriminating means for analyzing a signal sent form the addressee called by said calling means and discriminating the addressee data processing mode of the addressee, wherein said controlling means controls said data processing means to process the image data, when the data processing mode corresponding to the addressee selected by said selecting means is not stored in said memory means, with the data processing mode discriminated by said discriminating means. and wherein said transmitting means transmits the image data processed by said data processing mode discriminated by said calling means to the addressee called by said calling means.

8. A facsimile apparatus of claim 7. wherein said data processing means has multiple data compressing modes for compressing the image data with the compressing mode selected.

9. A facsimile apparatus comprising:
document image reading means for forming an image data corresponding to a document image;
data compressing means having multiple compressing modes for compressing the image data;
first memory means having multiple memory areas, each of which stores information on a facsimile apparatus of an addressee, the above information comprising at least a line number and an addressee compressing mode;
selecting means for selecting addressees one after another;
second memory means for storing the image data compressed by said data compressing means;
transmitting means for transmitting the image data stored in said second memory means to the addressees selected by said selecting means one after another; and
comparing means for comparing the compressing mode with which the image data stored in said second memory means has been compressed and the compressing mode corresponding to the addressee selected by said selecting means;
wherein said transmitting means gives priority in the order of the transmission to the addressees whose compressing mode are the same as one of the stored image data.

10. A facsimile apparatus for consecutively transmitting an image data to multiple addressees comprising:
document image reading means for forming an image data corresponding to a document image;
data compressing means having multiple compressing modes for compressing the image data;
first memory means having multiple memory areas, each of which stores information on a facsimile apparatus of an addressee, the above information comprising at least a line number and an addressee compressing mode;
controlling means for controlling said data compressing means to compress the image data with a first compressing mode;
second memory means for storing the image data compressed by said data compressing means;
selecting means for selecting addressees corresponding to a compressing mode with which the image data stored in said second memory means has been compressed; and
transmitting means for transmitting the image data stored in said second memory means to the addressees selected by said selecting means;
said controlling means controlling said data compressing means to compress the image data with a second compressing mode after said transmitting means transmits the image data with the first compressing mode.

11. In a facsimile apparatus comprising image data forming means for reading a document image and forming an image data corresponding to the document image and data compressing means for compressing the image data with one of multiple compressing modes and having a multiple addressing function for consecutively transmitting the image data compressed by said compressing means to multiple addressees, a data transmitting method comprising the steps of:
registering line numbers and addressee compressing modes of addressees;
discriminating the addressee compressing mode which is registered in the largest number among the registered addressee compressing modes;
selecting the compressing mode corresponding to the discriminated addressee compressing mode;
compressing the image data with the selected compressing mode; and
transmitting the compressed image data to an addressee.

12. A method of claim 11, further comprising a step of designating an addressee corresponding to the selected compressing mode, wherein the image data is transmitted to the designated addressee.

13. A method of claim 12. further comprising a step of storing the compressed image data, wherein the stored image data is transmitted.

14. A method of claim 13, further comprising steps of:
discriminating the addressee compressing mode registered in the largest number next to the previously-selected compressing mode among the registered addressee compressing modes;
selecting the compressing mode corresponding to the discriminated addressee compressing mode;
compressing the image data with the selected compressing mode; and
transmitting the compressed image data to the addressee.

15. In a facsimile apparatus comprising image data forming means for reading a document image and forming an image data corresponding to the document image and data compressing means for compressing the image data with one of multiple compressing modes and having a multiple addressing function for consecutively transmitting the image data compressed by said compressing means to multiple addresses, a data transmitting method comprising the steps of:
registering line numbers and addressee compressing modes of addressees;
compressing the image data with one of multiple compressing modes;
storing the compressed image data;
comparing the compressing mode with which the stored image data has been compressed and the registered addressee compressing modes of the addressees; and
transmitting the stored image data to the addressee corresponding to the addressee compressing mode with which the stored image data has been compressed.

16. A method of claim 15, when there is no addressee corresponding to the compressing mode with which the stored image data has been compressed, further comprising the steps of:
compressing the image data with a different compressing mode; and
transmitting the image data compressed with the different compressing mode.

17. A facsimile apparatus for consecutively transmitting an image data to multiple addressees comprising:

document image reading means for forming an image data corresponding to a document image;

data compressing means having multiple compressing modes for compressing the image data;

memory means having multiple memory areas, each of which stores information on a facsimile apparatus of an addressee, the above information comprising at least a line number and an addressee compressing mode;

operating means for designating addressees to which the image data is consecutively transmitted;

selecting means for, in reference to the information stored by the memory means, selecting the most compressing mode among the addressee compressing modes corresponding to the addressees designated by said operating means;

controlling means for controlling said data compressing means to compress the image data with the compressing mode selected by said selecting means; and transmitting means for transmitting the image data compressed by said data compressing means.

18. A facsimile apparatus comprising:

data compressing means for compressing an image data with one of a plurality of compressing modes;

image data storing means for storing the image data compressed by said data compressing means;

memory means having a plurality of memory ares each of which stores information on a facsimile apparatus of an addressee, said information comprising at least a line number and an addressee compressing mode;

comparing means for comparing the compressing mode with which the stored image data has been compressed and the addressee compressing modes stored in said memory means;

first transmitting means for transmitting the stored image data to the addressee corresponding to the addressee compressing mode with which the stored image data has been compressed; and second transmitting means for compressing the stored image data with a different compressing mode and transmitting the image data compressed with the different compressing mode to the addressee corresponding to the different compressing mode.

19. A facsimile apparatus comprising:

first memory means for storing an addressee data indicating an addressee to which an image data is to be transmitted;

second memory means for storing an additional data with which the image data is processed in accordance with the addressee;

transmitting means for transmitting the image data in accordance with the addressee data stored in said first memory means;

controlling means for discriminating the additional data corresponding to the addressee when the image data is transmitted by said transmitting means, and for storing the additional data in said second memory means in relation with the addressee data; and processing means for processing the image data in accordance with the additional data stored in said second memory means before the image data is transmitted by said transmitting means.

20. A facsimile apparatus of claim 19, wherein said additional data signifies an addressee compressing mode.

21. A facsimile apparatus of claim 19, wherein said controlling means compares the discriminated additional data and the additional data having been already stored in said second memory means and renews the additional data stored in said memory means when the discriminated data is different from the stored data.

22. A facsimile apparatus comprising:

document image reading means for forming an image data corresponding to a document image;

data processing means having multiple data processing modes for processing the image data with the mode selected;

memory means having multiple memory register areas, each of which stores information on a facsimile apparatus of an addressee, the above information comprising at least a line number and an addressee data processing mode;

selecting means for selecting an addressee;

calling means for calling the addressee selected by said selecting means;

controlling means for controlling said data processing means to process the image data, when the data processing mode related with the addressee selected by said selecting means is stored in said memory means, with the data processing mode stored in said memory means, and transmitting means for transmitting the image data processed by said data processing means to the addressee called by said calling means, wherein said apparatus further comprises discriminating means for analyzing a signal sent from the addressee called by said calling means and discriminating the addressee data processing mode of the addressee, and re-registering means for, when the addressee data processing mode of the addressee discriminated by said discriminating means is different from the data processing mode stored in said memory means, re-registering the former data processing mode in said memory means, wherein said transmitting means transmits the image data processed by said data processing mode discriminated by said discriminating means to the addressee called by said calling means.

23. A facsimile apparatus of claim 22, further comprising switching means for switching the apparatus to a mode for activating said re-registering means or to another mode for inactivating said re-registering means.

* * * * *

UNITED STATES PATENT AND TRADEMARK OFFICE
CERTIFICATE OF CORRECTION

PATENT NO. : 5,121,221
DATED : June 9, 1992
INVENTOR(S) : Hiroaki Hamano, et al.

It is certified that error appears in the above-identified patent and that said Letters Patent is hereby corrected as shown below:

On the cover page, in the listing of the "Inventors," after "Hiroaki Hamano;", insert --Munehiro Nakatani;--.

In Col. 8, line 8, after "before", insert --being--.

In Col. 8, line 42, before "through", insert --going--.

In Col. 9, line 1, before "through", insert --going--.

In Col. 15, line 20 (Claim 1, line 16), after "controlling" (second occurrence), insert --said data--.

In Col. 16, line 10 (Claim 5, line 11), after "selecting" (first occurrence), insert --means--.

In Col. 19, line 28 (Claim 18, line 6), change "ares" to --areas--.

Signed and Sealed this

Tenth Day of August, 1993

Attest:

MICHAEL K. KIRK

*Attesting Officer*    *Acting Commissioner of Patents and Trademarks*